United States Patent
Kim et al.

(10) Patent No.: US 12,426,110 B2
(45) Date of Patent: Sep. 23, 2025

(54) DEVICE AND METHOD FOR PROVIDING SERVICE ACCORDING TO WIRELESS COMMUNICATION NETWORK TYPE IN EDGE COMPUTING SYSTEM

(71) Applicant: Samsung Electronics Co., Ltd., Gyeonggi-do (KR)

(72) Inventors: Hyesung Kim, Gyeonggi-do (KR); Jicheol Lee, Gyeonggi-do (KR); Sunghoon Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 519 days.

(21) Appl. No.: 17/799,823

(22) PCT Filed: Feb. 5, 2021

(86) PCT No.: PCT/KR2021/001524
§ 371 (c)(1),
(2) Date: Aug. 15, 2022

(87) PCT Pub. No.: WO2021/167277
PCT Pub. Date: Aug. 26, 2021

(65) Prior Publication Data
US 2023/0062452 A1    Mar. 2, 2023

(30) Foreign Application Priority Data

Feb. 17, 2020 (KR) .......... 10-2020-0019323
Jun. 12, 2020 (KR) .......... 10-2020-0071368
Aug. 26, 2020 (KR) .......... 10-2020-0107806

(51) Int. Cl.
H04W 76/15    (2018.01)
H04W 28/08    (2023.01)
(Continued)

(52) U.S. Cl.
CPC ....... *H04W 76/15* (2018.02); *H04W 28/0831* (2020.05); *H04W 48/16* (2013.01); *H04W 48/18* (2013.01); *H04W 60/04* (2013.01)

(58) Field of Classification Search
CPC . H04W 76/15; H04W 28/0831; H04W 48/16; H04W 48/18; H04W 60/04; H04W 88/18; H04W 60/00
(Continued)

(56) References Cited

U.S. PATENT DOCUMENTS 10,609,636 B2    3/2020    Jeong et al.
10,652,812 B2    5/2020    Kim et al.
(Continued)

FOREIGN PATENT DOCUMENTS

CN    108282801    7/2018
CN    108293225    7/2018
(Continued)

OTHER PUBLICATIONS

PCT/ISA/210 Search Report issued on PCT/KR2021/001524, May 17, 2021 pp. 6.
(Continued)

*Primary Examiner* — Rownak Islam
(74) *Attorney, Agent, or Firm* — The Farrell Law Firm, P.C.

(57) ABSTRACT

According to one embodiment of the present disclosure, a method by which an edge enabler server (EES) of an edge computing system provides an edge computing service to user equipment (UE) comprises steps in which: the UE receives a registration message including available or currently connected core network (CN) type information or radio access technology (RAT) type information; a first network function (NF) device of a core network for providing the edge computing service to the UE is selected on the (Continued)

basis of the CN type information or the RAT type information; and a registration response message is transmitted to the UE, wherein, if the registration message includes the CN type information, one from among a first type for supporting a first CN, a second type for supporting a second CN, and a third type for supporting both the first CN and the second CN is indicated, and, if the registration message is the RAT type information, one from among a first type for supporting a first RAT, a second type for supporting a second RAT, and a third type for supporting both the first RAT and the second RAT can be indicated.

20 Claims, 15 Drawing Sheets

(51) Int. Cl.
  *H04W 48/16* (2009.01)
  *H04W 48/18* (2009.01)
  *H04W 60/04* (2009.01)
(58) Field of Classification Search
  USPC .......................................................... 370/329
  See application file for complete search history.

(56) References Cited

U.S. PATENT DOCUMENTS

| | | | |
|---|---|---|---|
| 11,196,840 | B2 | 12/2021 | Kim et al. |
| 2018/0270745 | A1 | 9/2018 | Jeong et al. |
| 2019/0123966 | A1* | 4/2019 | Boutros ................ H04L 41/12 |
| 2019/0159090 | A1 | 5/2019 | Keller et al. |
| 2019/0207778 | A1 | 7/2019 | Qiao et al. |
| 2019/0297121 | A1 | 9/2019 | Qiao et al. |
| 2019/0342827 | A1 | 11/2019 | Kim et al. |
| 2021/0099848 | A1* | 4/2021 | Ruan ................. H04W 84/042 |
| 2024/0073672 | A1* | 2/2024 | Bi ......................... H04W 8/14 |

FOREIGN PATENT DOCUMENTS

| | | |
|---|---|---|
| CN | 108293226 | 7/2018 |
| CN | 109155964 | 1/2019 |
| KR | 10-2017-0058762 | 5/2017 |
| KR | 10-2019-0007519 | 1/2019 |
| KR | 10-2021-0023608 | 3/2021 |
| KR | 10-2021-0087881 | 7/2021 |
| WO | WO 2018/085187 | 11/2018 |
| WO | WO 2019/236755 | 12/2019 |
| WO | WO 2020/033798 | 2/2020 |

OTHER PUBLICATIONS

PCT/ISA/237 Written Opinion issued on PCT/KR2021/001524, May 17, 2021, pp. 4.
Convida Wireless LLC et al., 'EEC Registration based on TR solution 8', S6-200344, 3GPP TSG-SA WG6 Meeting #35, Hyderabad, India, Jan. 17, 2020, pp. 6.
Samsung, 'Ue location reporting API', S6-200093, 3GPP TSG-SA WG6 Meeting #35, Hyderabad, India, Jan. 8, 2020, pp. 10.
3GPP TS 23.558 V0.1.1, 3GPP, 3rd Generation Partnership Project; Technical Specification Group Services and System Aspects; Architecture for Enabling Edge Applications; (Release 17), Jan. 2020, 40 pages.
3GPP TR 23.758 V 17.0.0, 3GPP, 3rd Generation Partnership Project; Technical Specification Group Services and System Aspects; Study on Application Architecture For Enabling Edge Applications; (Release 17), Dec. 2019, 114 pages.
Samsung, "UE NAS Mode and Interaction with 3GPP Network", S6-202072, 3GPP TSG-SA WG6 Meeting #40-e, Nov. 16-24, 2020, 4 pages.
Samsung, "UE CN Type and Interaction with 3GPP Network", S6-201263, 3GPP TSG-SA WG6 Meeting #38-e, Jul. 20-31, 2020, 4 pages.
European Search Report dated Jun. 2, 2023 issued in counterpart application No. 21757170.2-1216, 14 pages.
Ericsson, "Network Provided Location Information for UE Accessing P-CSCF from Internet without Usage of EPC (or other PS Core Network)", C1-164649, 3GPP TSG-CT WG1 Meeting #100, Oct. 17-21, 2016, 23 pages.
Chinese Office Action dated Mar. 8, 2024 issued in counterpart application No. 202180015124.5, 10 pages.

* cited by examiner

DEVICE AND METHOD FOR PROVIDING SERVICE ACCORDING TO WIRELESS COMMUNICATION NETWORK TYPE IN EDGE COMPUTING SYSTEM

PRIORITY

This application is a National Phase Entry of PCT International Application No. PCT/KR2021/001524, which was filed on Feb. 5, 2021, and claims priority to Korean Patent Application Nos. 10-2020-0019323, 10-2020-0071368, and 10-2020-0107806, which were filed on Feb. 17, 2020, Jun. 12, 2020, and Aug. 26, 2020, respectively, the entire content of each of which is incorporated herein by reference.

TECHNICAL FIELD

The disclosure relates to a device and a method for providing a service in an edge computing system, and in particular, to a device and a method for providing a service according to a wireless communication network type in an edge computing system.

BACKGROUND ART

In an edge computing system, in order to use a low-latency or broadband service, a UE may establish a data connection to an edge data network that is located close to the location of the UE itself. Further, in the edge computing system, the UE may be provided with a data service by accessing an application server being driven in an edge hosting environment being operated by an edge enabler server of the corresponding edge data network or in an edge computing platform.

A UE that intends to access an edge computing system may be a mobile communication UE that is provided with a mobile communication service. A mobile communication UE may access an edge data network through a mobile communication network, and may be provided with a service from a specific edge application server that is operated by an edge enabler server of the corresponding edge data network. The mobile communication UE should be able to move without special restrictions, and the service should be successively provided. Since the mobile communication UE can move without special restrictions, a core network of a wireless network may be changed due to movement of the mobile communication UE.

As described above, if a radio core network of the UE is changed, there may occur a service that can be supported by the core network being newly accessed by the mobile communication UE, that is, the changed core network, and a service that cannot be supported by the changed core network. Further, if the radio core network of the mobile communication UE is changed, support of the service may be possible, but delay of the service may occur. If a service providing method is not modified to match such a situation, the mobile communication UE is unable to be provided with a proper edge computing service. In addition, if a network service provider changes a policy for a user, an available core network may be changed. Even in this case, if the service providing method is not modified to match the situation, the mobile communication UE is unable to be provided with the proper edge computing service.

Meanwhile, the edge computing system may be installed/configured to provide a service specialized to the type of a specific UE (e.g., information capable of distinguishing a smart phone, a vehicle, or an IoT device from one another or furthermore, discriminating a manufacturing company and a model of the specific UE). For example, a service provider of a mobile communication network may separately install an edge computing server configured to provide a specialized service to a UE mounted on a vehicle or integrated with a vehicle among UEs having accessed a mobile communication network, for example, a 3GPP network. However, in the current edge computing system, there is no method capable of obtaining UE type information. Further, there is no method capable of providing information about EES or EAS to the UE based on the UE type information. The UE can provide permanent equipment ID (PEI) to the 3GPP network, but in case of providing the PEI to an edge computing server installed outside the 3GPP network of the service provider, the PEI may be used to specify and track the user, and thus personal information infringement may occur.

Further, a UE that receives a service from a mobile communication network may use various radio access methods. For example, the UE may be provided with a service of a 4G mobile communication network, or may be provided with a service of a 5G mobile communication network. However, the edge computing system has a problem in that the UE does not know from which network the UE is provided with a service.

Further, if a specific UE moves to a 5G mobile communication network after being provided with a service from a 4G mobile communication network, or the UE moves from the 5G mobile communication network to the 4G mobile communication network, there is no method capable of recognizing such a movement. In addition, it is not possible to identify whether the UE is an electronic device capable of being provided with a service from both the 4G mobile communication network and the 5G mobile communication network or an electronic device capable of being provided with the service only from one specific mobile communication network.

Accordingly, in case of providing the service to the UE, the edge computing system is unable to identify which network to select, and in case that the UE moves between the mobile communication systems using different radio access methods, the edge computing system is unable to recognize this movement. Accordingly, it is required for the edge computing system to recognize the movement of the UE between the mobile communication networks and to provide a continuous service.

DISCLOSURE OF INVENTION

Technical Problem

The disclosure provides a method and a device for providing an edge computing service in accordance with a wireless communication core network type of user equipment (UE).

The disclosure provides a method and a device for modifying an edge computing service providing method in accordance with a change of a core network type of a UE.

The disclosure provides a method and a device for providing type information of a UE to an edge computing network and/or an edge computing server.

The disclosure provides a method and a device for providing type information of a UE to an edge computing network and/or an edge computing server in case that the type information of the UE is updated.

The disclosure can provide a guide for establishing an edge computing system capable of providing a specialized service based on the type of a UE.

The disclosure can provide a method and a device for providing an edge computing system with UE type information capable of preventing personal information infringement.

In case that a UE moves by using a different radio access method in a mobile communication network, the disclosure provides a method for recognizing this UE movement, and providing a continuous service in an edge computing system.

Solution to Problem

According to an embodiment of the disclosure, a method for providing, by an edge enabler server (EES) of an edge computing system, an edge computing service to user equipment (UE) may include: receiving a registration message including core network (CN) type information or radio access technology (RAT) type information, being available or being currently connected to the UE; selecting a first network function (NF) device of a core network configured to provide an edge computing service to the UE based on the CN type information or the RAT type information; and transmitting a registration response message to the UE, wherein in case that the registration message includes the CN type information, the CN type information indicates one of a first type supporting a first CN, a second type supporting a second CN, or a third type supporting both the first CN and the second CN, and wherein in case that the registration message includes the RAT type information, the RAT type information indicates one of a first type supporting a first RAT, a second type supporting a second RAT, or a third type supporting both the first RAT and the second RAT.

According to an embodiment of the disclosure, an edge enabler server (EES) device of an edge computing system may include: a communication unit configured to be able to communicate with user equipment (UE), at least one network function (NF) device of a mobile communication core network, and another node of an edge computing network; a memory configured to store information related to the UE and edge computing service information; and at least one processor, wherein the at least one processor is configured to: receive, through the communication unit, a registration message including core network (CN) type information or radio access technology (RAT) type information, being available or being currently connected to the UE, select a first NF device of a core network configured to provide an edge computing service to the UE based on the CN type information or the RAT type information, and control the communication unit to transmit a registration response message to the UE, and wherein in case that the registration message includes the CN type information, the CN type information indicates one of a first type supporting a first CN, a second type supporting a second CN, or a third type supporting both the first CN and the second CN, and wherein in case that the registration message includes the RAT type information, the RAT type information indicates one of a first type supporting a first RAT, a second type supporting a second RAT, or a third type supporting both the first RAT and the second RAT.

Advantageous Effects of Invention

According to the disclosure, even if a change of a core network type occurs in accordance with a change of movement or subscription information of a UE, it is possible to provide a continuous edge computing service. Accordingly, it is possible to provide an edge computing service that supports interworking between 5GC and EPC in a wireless communication system, for example, a 3GPP system.

Further, according to the disclosure, UE type information can be utilized to provide an edge computing service by providing an edge computing server with only a type allocation code instead of a PEI value that may cause user's personal information infringement.

Further, according to the disclosure, it is possible to provide UE type information that can be obtained and utilized by an edge computing service provider or an edge application server provider other than a mobile communication network provider, for example, a 3GPP network service provider.

Further, according to the disclosure, a 3GPP network service provider can establish an edge computing system that can provide a specialized service in accordance with an edge computing service provider and UE type.

Further, according to the disclosure, in case that a UE moves by using a different radio access method in a mobile communication network, an edge computing system can recognize this movement, and can provide a continuous service.

MODE FOR THE INVENTION

Hereinafter, the operation principle of the disclosure will be described in detail with reference to the accompanying drawings. Furthermore, terms to be described hereunder have been defined in consideration of functions in the disclosure, and may be changed depending on a user, an operator's intention, or practice. Accordingly, the definitions of the terms should be determined based on the contents over the entire specification.

The disclosure discloses a communication system, and a UE of the communication system may establish a data connection to an edge data network that is located close to the location of the UE itself in order to use a low-latency or broadband service. Such a UE may access an edge hosting environment being operated by an edge enabler server of the corresponding edge data network, or an application server being driven on an edge computing platform. Mobile edge computing in which the UE is provided with a data service from the edge application server through this will be described. Particularly, in the disclosure, a method in which a mobile terminal that accesses, for example, a 3GPP network drives an edge computing system in accordance with the type of a wireless communication network will be described.

The disclosure provides an edge computing service method in accordance with a core network type accessed by a mobile terminal.

According to an embodiment of the disclosure, a method in which a mobile terminal identifies a core network type accessed by the mobile terminal is provided.

According to another embodiment of the disclosure, a method in which a mobile terminal interworks with a mobile communication network, for example, a 3GPP network, in accordance with the core network type accessed by the mobile terminal is provided.

According to still another embodiment of the disclosure, a method for identifying an available 3GPP service application program interface (API) and configuring and updating a related edge computing service procedure is provided.

The terms referring to network entities and entities of an edge computing system, terms referring to messages, and terms referring to identification information, which are used in the disclosure, have been exemplified for convenience in explanation. Accordingly, the disclosure is not limited to the terms to be described later, and other terms referring to objects having equivalent technical meanings may be used.

Hereinafter, for convenience in explanation, although terms and names defined in the 3GPP system standards are used in the disclosure, the disclosure is not limited by the above terms and names, and may be equally applied to systems complying with other standards.

Figure 1:
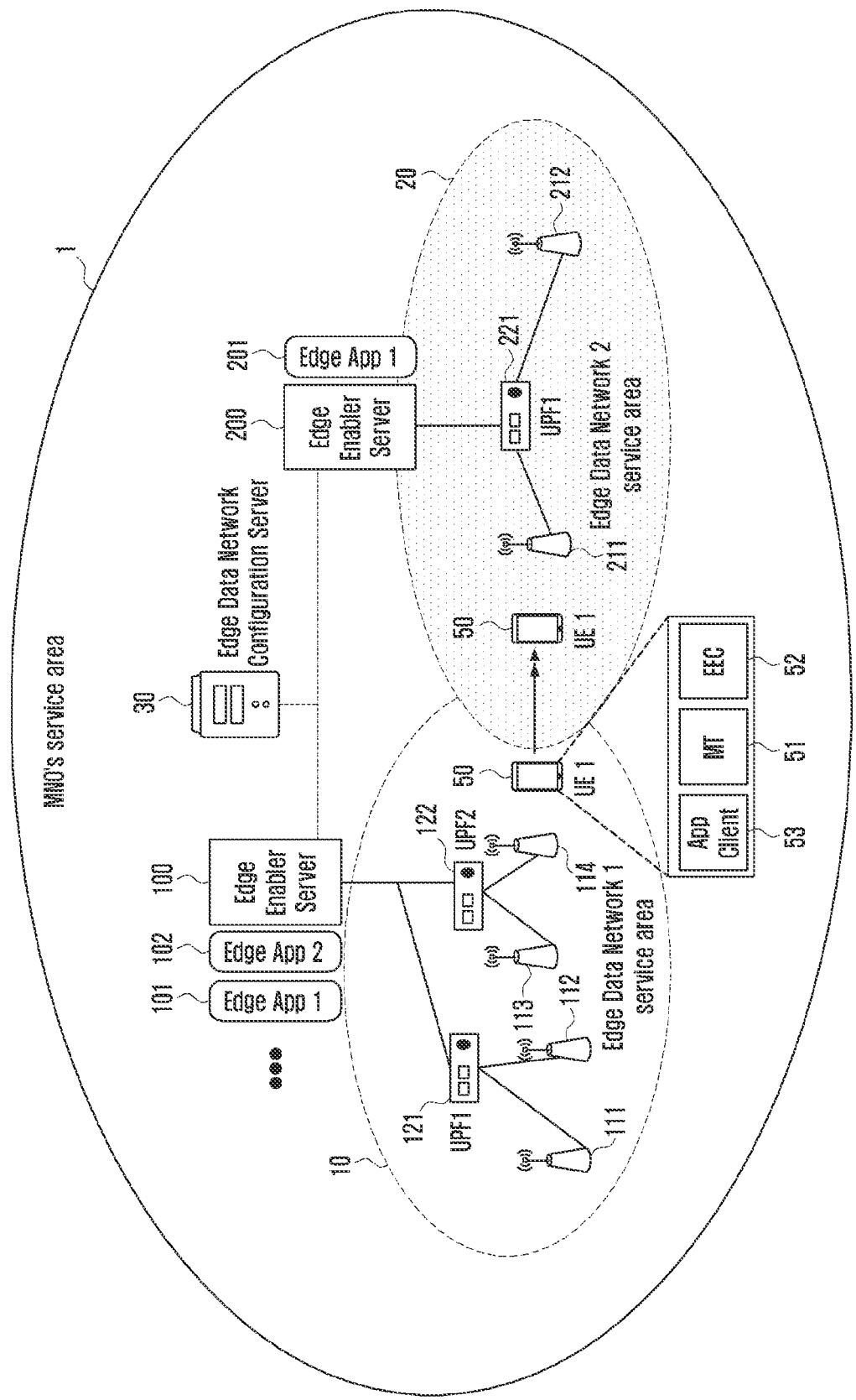
FIG. 1 is an exemplary diagram explaining connection between a 3GPP network and an edge computing system network and movement of a UE according to the disclosure.

FIG. 1 is an exemplary diagram explaining connection between a 3GPP network and an edge computing system network and movement of a UE according to the disclosure.

With reference to FIG. 1, a service area 1 of a mobile network operator (MNO) is exemplified. The service area 1 of the mobile network operator may include edge data networks separated to provide edge computing services to an electronic device, for example, a mobile terminal of the 3GPP system. The edge data networks may have areas 10 and 20 for providing the edge computing services to the electronic device. For example, FIG. 1 exemplifies a case that the service area 10 of a first edge data network includes a first base station 111, a second base station 112, a third base station 113, and a fourth base station 114, and the service area 20 of a second edge data network includes a fifth base station 211 and a sixth base station 212.

FIG. 1 also exemplifies that two different user plane function (UPF) devices 121 and 122 are included in the service area 10 of the first edge data network including the first to fourth base stations 111 to 114. In the following description, unless specially mentioned, each of the UPFs 121 and 122 may be logically understood as one network device. Further, in a specific case, both the UPFs 121 and 122 may be logically understood as one network device. In the following description, the UPFs 121 and 122 are referred to as UPF devices or UPFs. Further, FIG. 1 exemplifies that only one user plane function (UPF1) 221 is included in the service area 20 of the second edge data network. As can be known in the example of FIG. 1, one or two or more UPFs may be included in one edge data network.

The service area 10 of the first edge data network may be an area configured by one edge enabler server 100. Further, the service area 20 of the second edge data network may be an area configured by another edge enabler server 200. Like this, the service areas 10 and 20 of the edge data networks may be configured as areas that can be managed by the edge enabler servers 100 and 200.

As exemplified in FIG. 1, the edge enabler servers 100 and 200 may be connected to or may be included in the same or different edge application servers 101, 102, and 201. The first edge application servers 101 and 201 and the second edge application server 102 may provide different edge computing services. The first edge application server 101, which is located in the service area 10 of the first edge data network, and the first edge application server 201, which is located in the service area 20 of the second edge data network and provides the same service as that of the first edge application server 101, may provide the edge computing service to an electronic device 50 through the different edge enabler servers 100 and 200. As exemplified in FIG. 1, the first edge application server 101 located in the service area 10 of the first edge data network may provide the edge computing service to the electronic device 50 that accesses any one of the base stations 111, 112, 113, and 114 located in the first edge data network. The second edge application server 102 may provide the edge computing service to the electronic device that accesses any one of the base stations 111, 112, 113, and 114 located in the first edge data network.

The electronic device 50 may be a mobile terminal that can be provided with the edge computing service according to the disclosure, and can access a mobile communication network through a radio network. Examples of the electronic device 50 may include various mobile electronic devices, such as a smart phone, a tablet PC, a smart watch, a game machine, an automobile, a motorcycle, a bicycle, an aircraft, a ship, and the like, and/or various types of electronic devices capable of providing an IoT service. According to the disclosure, the electronic device 50 may be mounted with at least one edge computing service application 53, and according to the disclosure, the electronic device 50 may include an edge enabler client 52, and may include a mobile terminal 51 that performs a radio communication function, for example, a communication layer.

The case where the electronic device 50 is mounted with the edge computing service application may mean that an application for being provided with the edge computing service may be installed (or stored) in a memory (not illustrated in the drawing) of the electronic device 50. Further, the case where the electronic device 50 is mounted with the edge computing service application may mean that the application installed in the electronic device 50 can be loaded on at least one processor to perform an operation for providing the edge computing service.

The edge enabler client 52 may be installed in the memory (not illustrated in the drawing) of the electronic device 50 mounted with the application for being provided with the edge computing service. Further, the edge enabler client 52 may mean that it is loaded on at least one processor instead of the installed application, and is able to perform at least some of operations that are required for the edge computing service application.

The mobile terminal (MT) 51 may include a communication layer that can communicate with a specific wireless communication network, for example, the 3GPP communication network in a configured method. The communication layer may include at least one communication processor and/or a modem, and may include logic for transmission and reception of a radio signal and at least one antenna.

Hereinafter, for convenience in explanation, the electronic device 50 is called user equipment (UE). Further, unless specially limited, it may be understood that the UE or the mobile terminal is an electronic device or user equipment in case that the reference numeral 51 does not denote the UE or the mobile terminal.

The base stations 111, 112, 113, 114, 211, and 212 have specific areas in which they can perform communication with the user equipment 50 in a configured wireless communication method. For example, in case that the configured wireless communication method uses the 3GPP mobile communication network method, the base stations 111, 112, 113, 1113, 114, 211, and 212 may be the base stations of the 3GPP mobile communication network.

The configuration of FIG. 1 described above exemplarily illustrates a case where the configuration interworks with the edge computing deployment and a 5G network of the mobile communication network.

The user plane functions (UPFs) 121, 122, and 221 may serve as gateways that transfer packets corresponding to user data transmitted and received by the user equipment. According to an embodiment of the disclosure, the UPFs 121, 122, and 221 may be located physically and/or logically close to the edge enabler servers 100 and 200 in order to support the edge computing service. As the UPFs 121, 122, and 221 and the edge enabler servers 100 and 200 are configured to be physically and/or logically close to each other, transmission delay can be reduced by directly transferring data packets to be provided to the user (or electronic device 50) (or received from the user) to the edge data network without passing through the Internet. That is, low-latency transmission is possible. According to another embodiment of the disclosure, the UPFs 121, 122, and 221 may be connected to the data network that is connected to the edge enabler servers 100 and 200 through the Internet.

According to an embodiment of the disclosure, the edge computing system may be composed of edge enabler servers 100 and 200, an edge data network configuration server 30, and an edge enabler client (EEC) 52. According to various embodiments of the disclosure, the edge enabler servers 100 and 200 may establish an edge hosting environment or an edge computing platform. Establishment of the edge hosting environment or the edge computing platform may mean a case where the edge enabler server and at least one edge application server are connected to each other, or at least one edge application server is driven on the computing platform of the edge enabler server. Accordingly, the edge enabler servers 100 and 200 can be aware of information about the edge application server that is driven in the edge hosting environment or is driven on the edge computing platform.

According to various embodiments of the disclosure, the edge enabler server may negotiate with the user equipment 50, and may connect between the application client 52 being driven in the user equipment 50 and the edge application server in the edge hosting environment. According to various embodiments of the disclosure, the user equipment 50 that supports the edge computing system may be built in or mounted with the edge enabler client 52 as described above. According to an embodiment of the disclosure, the negotiation between the user equipment 50 and the edge application server may be performed through interworking between the edge enabler client 52 in the user equipment 50 and the edge enabler servers 100 and 200. According to an embodiment of the disclosure, an availability layer on which the interworking, such as the negotiation, between the edge enabler client 52 and the edge enabler servers 100 and 200 is performed may be called an edge enabling layer. Examples of the UE or the user equipment 50 according to the disclosure may include not only the smart phone described above but also an IoT device and a vehicle.

According to various embodiments of the disclosure, the edge data network configuration server 30 may be aware of deployment information of the edge enabler servers 100 and 200, and may perform a function for transferring configuration information for using the edge computing service to the user equipment 50. According to an embodiment of the disclosure, the configuration information may include at least one of edge data network connection information, an edge data network service area, and edge enabler server connection information. It may be considered that the edge data network is not separately defined, and a local data network in which the edge enabler server and the edge application server are present corresponds to the edge data network. The edge data network configuration server may be called an edge configuration server (ECS) 30.

According to various embodiments of the disclosure, examples of the edge data network connection information may include information, such as a data network name, and single-network slice selection assistance information (S-NSSAI). Here, the network slice means that a device (or server) that performs a specific function in a core network can be implemented in a slice form. For example, the UPF may be implemented by one server, or may be implemented by network equipment. As another example, one server or network equipment may include two or more UPF slices therein. As still another example, one UPF may be implemented by two or more servers, or may be implemented by two or more network equipment. The specific network slice may be understood as the network equipment that logically performs one specific function. The network slice may include one network function (NF) device, or two or more different network function devices may constitute one network slice. Here, the two or more different network function devices may be network function devices that perform the same function, or may be network function devices that perform different functions. According to various embodiments of the disclosure, the edge data network service area may include, for example, at least one or two or more of a cell list, a list of tracking areas, and a network identifier of a service provider (PLMN ID). According to various embodiments of the disclosure, the edge enabler server connection information may be, for example, a uniform resource identifier (URI).

According to various embodiments of the disclosure, the user equipment 50 may receive, from the edge data network configuration server 30, accessible edge enabler server information based on information, such as a specific location, for example, a specific base station, a specific data network, a specific network device and/or a physical location of the specific data network. According to an embodiment of the disclosure, if the edge data network configuration server 30 can be aware of information about the edge application server being driven in the edge hosting environment of the specific edge enabler server, the user equipment 50 can also obtain the corresponding information through the edge enabler client 52.

According to various embodiments of the disclosure, the edge application servers 101, 102, and 201 may mean third party application servers being driven in the edge computing system. According to an embodiment of the disclosure, the edge application servers 101, 102, and 201 may be third party application servers being driven on an infrastructure provided in the edge hosting environment, and since they can provide services at a location close to the user equipment 50, they can provide low-latency services. According to various embodiments of the disclosure, information about an upper layer of a service that is provided from the edge application server to the user equipment 50 may be referred to as application context. For example, when the user uses a real-time game application, all pieces of information required to regenerate screen and play stages being viewed by the user in the current game may be included in the application context. For example, in order for the user equipment 50 to be connected to another edge application server and to use the existing service without interruption, the application context should be relocated in an edge application server to be newly connected. In order to perform the application context relocation, the edge application server that can provide the service to the application being driven by the application client 53 of the user equipment 50 needs to be in an available state. Whether the edge application server in the edge data network has availability may be determined depending on whether it is driven in the edge hosting environment and the state of the edge application server.

The edge enabler servers 100 and 200, the edge application servers 101, 102, and 201, and the edge data network configuration server 30 in the edge computing system may obtain UE related information from the mobile communication system. More specifically, for example, the 3GPP system may include a network exposure function (NEF) device that is a network entity exposing a network function. In this case, at least one of entities constituting the edge computing system may include or use an application program interface (API) that provides the network exposure function. The entity of the edge computing system that includes or uses the API may obtain user equipment related information by using the API.

According to various embodiments of the disclosure, as described above, there exist in the user equipment 50 the application client 53, the edge enabler client 52 that makes the edge computing service interwork with the application client 53, and the mobile terminal (MT) 51 that accesses the mobile communication system. According to various embodiments of the disclosure, the application of the user equipment 50 is an application provided by a third party, and means a client application program that is driven in the user equipment 50 for a specific application service. In the user equipment 50, two or more applications may be driven individually or simultaneously. According to an embodiment of the disclosure, at least one of such applications may use a multi-access edge computing (MCE) service. The edge enabler client 52 in the user equipment 50 may mean a client that performs an operation in the user equipment 50 necessary to use the edge computing service. According to an embodiment of the disclosure, the edge enabler client 52 may identify which application can use the edge computing service, and may perform an operation for connecting the network interface so that data of the application client of the user equipment 50 can be transferred to the edge application server that provides the edge computing service. According to an embodiment of the disclosure, the user equipment 50 may configure a radio channel with the base station through the mobile terminal 51 in order to use the edge computing service. The radio channel configuration may be performed by the communication layer of the mobile terminal 51, for example, the 3GPP communication layer. According to an embodiment of the disclosure, the communication layer of the mobile terminal 51 may serve to establish a radio connection for data communication, to register the user equipment 50 in the mobile communication system, to establish a connection for data transmission in the mobile communication system, and to transmit and receive data.

Meanwhile, the network functions (NFs) that are driven in the 3GPP network exemplified in FIG. 1 or to be explained hereinafter will be explained as "devices". However, in actual implementation, the NFs in one physical server may be implemented in an instance form.

In the disclosure, one instance is implemented as specific software, the software that performs one instance operation may be implemented to be driven in one physical hardware device.

According to another embodiment of the disclosure, one instance may be driven by two or more physical hardware devices, for example, two or more servers or different racks constituting one server, other than one physical hardware device.

According to still another embodiment of the disclosure, one physical hardware device, for example, one server may drive two or more different instances. In this case, at least some of the NFs exemplified in FIG. 1 may be driven by the same physical hardware.

According to yet another embodiment of the disclosure, one physical hardware device may drive two or more instances that perform the same function. In case that one physical hardware device drives two or more instances that perform the same function, the respective instances may have different control and/or service targets, for example, different user equipment (UE). In case that one instance performs a specific operation for providing the control and/or the service for the same target, for example, the same user equipment (UE), the same UE may have different identifiers for different services and/or controls.

In the following description, for convenience in explanation, one NF is explained as one device. However, as described above, the respective NFs may be implemented as one or two or more instances, and may include all of the above cases. Further, other unexplained NFs will be explained as a device based on the above explanation. However, in actual implementation, the respective NFs may be implemented as one or two or more instances.

Figure 2A:
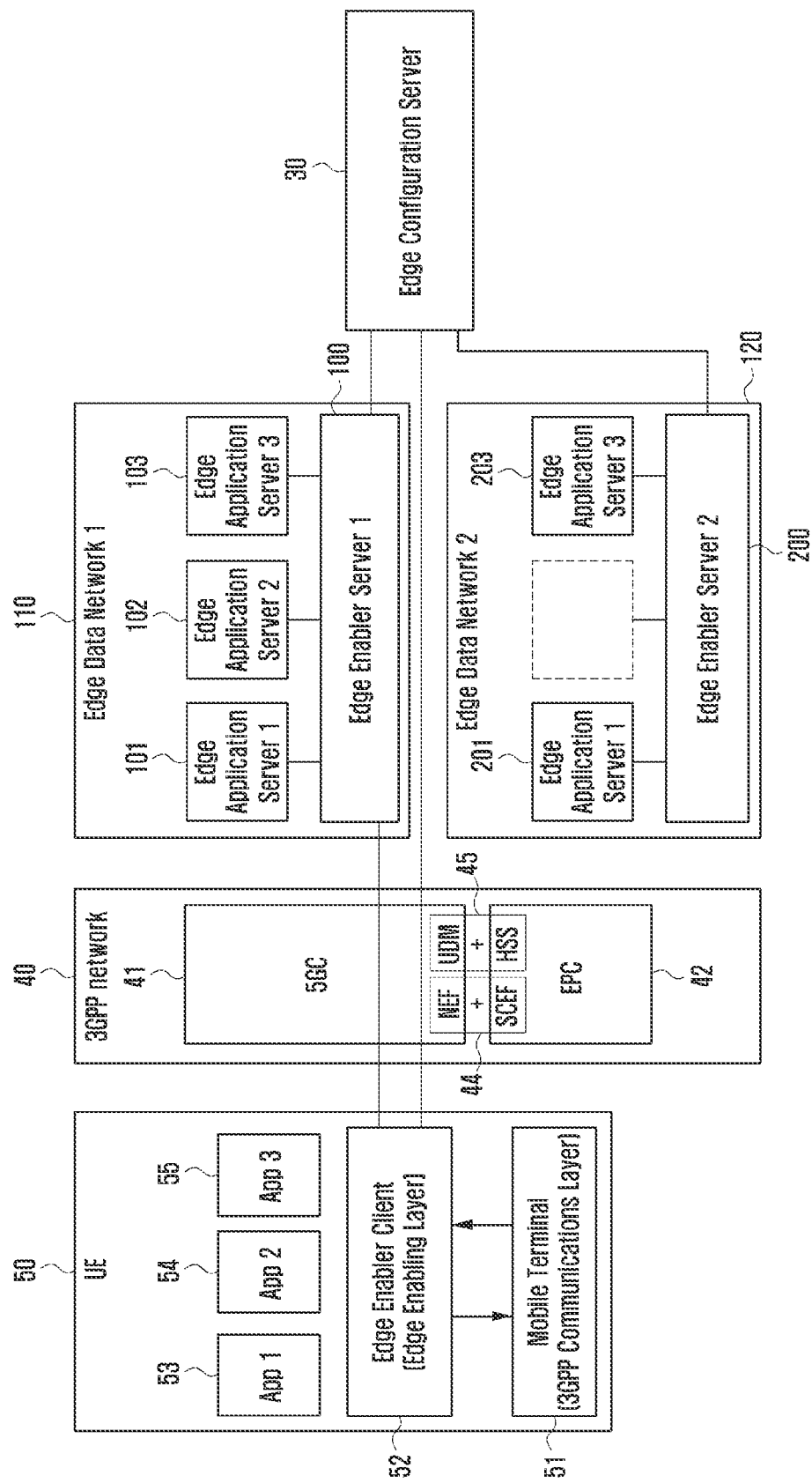
FIGS. 2A and 2B are exemplary diagrams explaining a connection of a UE to an edge computing system through a UE edge enabling layer and 3GPP communication layer structure according to the disclosure.
Figure 2B:
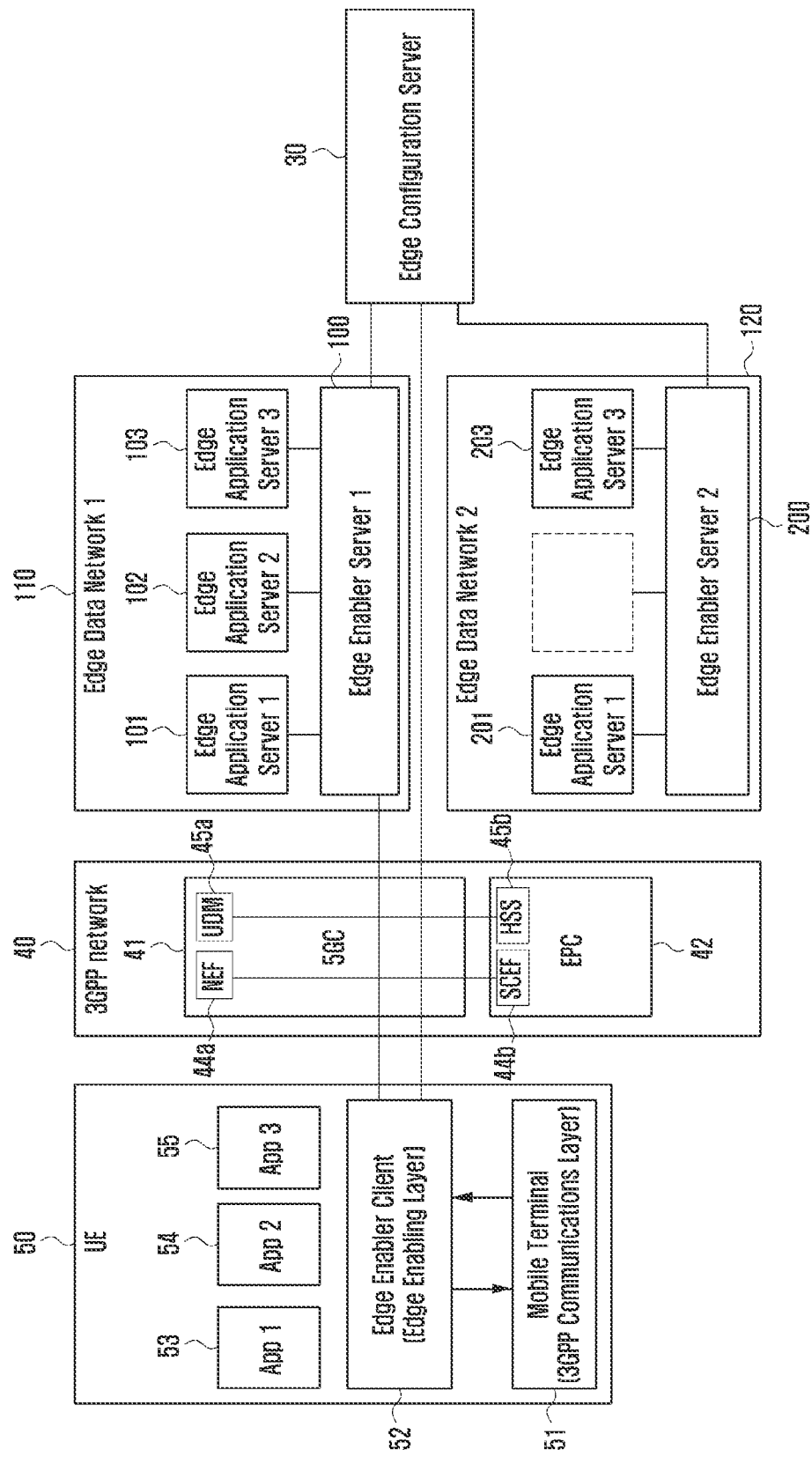

FIGS. 2A and 2B are exemplary diagrams explaining a connection of a UE to an edge computing system through UE edge enabling layer and 3GPP communication layer structures according to the disclosure. That is, the structure of FIGS. 2A and 2B are exemplary diagrams for intuitively identifying a connection structure between an edge computing system and a UE through a 3GPP network as compared with that of FIG. 1.

First, with reference to FIG. 2B, a core of a mobile communication system, for example, a 5G mobile communication system (5G Core or 5GC) 41 may include a network exposure function (NEF) device 44a in addition to the NFs described above with reference to FIG. 1. Further, the NEF device 44a can access information for managing the user equipment 50 in the 5G network, and may be a network entity that can perform subscription for a mobility management event of the corresponding user equipment 50, subscription for a session management event of the corresponding user equipment 50, a request for session related information, billing information configuration of the corresponding user equipment 50, a request for PDU session policy change for the corresponding UE, and transmission of a small amount of data for the corresponding user equipment 50. In a core (evolved packet core (EPC)) network of a 4G mobile communication system, a service capability exposure function (SCEF) device 44b may operate like the NEF device 44a. That is, the SCEF device 44b can access information for managing the user equipment 50 in the 4G network, and may serve to provide location information of the user equipment 50, and information about a connection state with a packet data network to an application server outside the mobile communication system. The NEF device 44a and the SCEF device 44b may exchange information about the specific user equipment 50 with each other through their interworking. FIG. 2B exemplifies connection line for interworking.

Meanwhile, there may be a case that the same service provider operates both the 4G network and the 5G network, and supports interworking between the two networks (4G network and 5G network). In this case, the service provider that operates both the 4G network and the 5G network may implement and operate an SCEF+NEF node 44 as an integrated device having at least some of functions of the SCEF device 44b and at least some of functions of the NEF device 44a for interworking between the NEF device 44a and the SCEF device 44b. As another example, the service providers of the two networks (4G network and 5G network) are the same service provider, the node may be implemented to perform all functions of the SCEF device 44b and all functions of the NEF device 44a. Further, although it is exemplified in the present embodiment that the service providers of the two networks (4G network and 5G network) are the same service provider, one node that performs the same function may be implemented based on a mutual agreement even in case where the service providers are separate service providers.

FIG. 2A exemplifies that in the above-described situation, that is, even if the same service provider operates both the 4G network and the 5G network, or different service providers operate the 4G network and the 5G network, one node that performs the same function based on the mutual agreement may be implemented. That is, the SCEF+NEF 44 exemplified in FIG. 2A may be the NF for exposing a service capability of a mobile communication network (4G network and 5G network) to an external network. Further, in case that the SCEF+NEF 44 actually has some functions of the NEF device 44a and the SCEF device 44b, the NFs having the remaining functions may be implemented as separate NFs as exemplified in FIG. 2B. In the disclosure, under the assumption that such three kinds of situations are all included, explanation will be made based on the configuration of FIG. 2A. In case of having the configuration as in FIG. 2A, the edge enabler servers 100 and 200 corresponding to an external function of the mobile communication network may both access the 3GPP core network 40 through the NEF+SCEF 44. In such an implementation form, not only the NEF+SCEF 44 but also a UDM+HSS 45 may include the three kinds of cases in the same manner.

The edge enabler servers 100 and 200 corresponding to the external functions of the mobile communication network may both access the 3GPP core network 40 through the NEF+SCEF 44. In this case, when the edge enabler servers 100 and 200 provide actual data (edge computing service data) to the user equipment 50, they may transfer the actual data to the user equipment 50 through a serving gateway (SGW) (not illustrated in the drawing). As another example, when providing the actual data (edge computing service data) to the user equipment 50, the edge enabler servers 100 and 200 may perform transmission/reception of the edge computing service data by using another device other than the serving gateway, for example, a network node (or NF), such as MME (not illustrated in the drawing) or AMF.

With reference back to FIG. 2B, a home subscriber server (HSS) 45b may perform mobility management, call and session configuration, user authentication and access authorization functions of the user equipment 50. Further, a unified data management (hereinafter, referred to as "UDM") device 45a may be a network entity that stores information about subscribers or/and user equipment 50. With reference to FIG. 2B, at least some functions of the HSS 45b and at least some functions of the UDM device 45a may be implemented as a new network entity, or may be performed through their interactions. FIG. 2B exemplifies a connection line for interworking.

Meanwhile, the UDM+HSS 45 may be implemented to have all functions or only some functions of the UDM device 45a and the HSS 44b. In case that the UDM+HSS 45 is implemented to have all functions of the UDM device 45a and the HSS 44b, it may have the form in FIG. 2A. In contrast, if the UDM+HSS 45 is implemented to have only some functions of the UDM device 45a and the HSS 44b, the NFs having the remaining functions may be implemented as separate NFs as exemplified in FIG. 2B. In the disclosure, under the assumption that such three kinds of situations are all included, explanation will be made based on the configuration of FIG. 2A.

The functions of FIGS. 2A and 2B as described above may be mixed in configuring a network. In configuring not only the configuration of FIGS. 2A and 2B but also the configuration of FIG. 2A, in case that only partial functions of the NEF and the SCEF are implemented as the NEF+SCEF 44, and only partial functions of the UDM and the HSS are implemented as the UDM+HSS 45, the NEF and the SCEF and the UDM and the HSS for performing the remaining function may be implemented in the corresponding networks. In the disclosure, it is to be noted that such various cases can be used without any special restrictions.

Other remaining configurations may have all the same configurations as those of FIG. 1 as described above. Hereinafter, at least two kinds of methods in which the edge enabler client (EEC) 52 in the user equipment 50 obtains information about the core network type supportable by the user equipment 50 are as follows.

1) The mobile terminal (MT) 51 of the user equipment 50 may receive the core network type supportable by the mobile terminal 51 from the 3GPP communication layer. For example, the core network type supportable by the mobile terminal (MT) 51 may be specified for each subscriber identification module (SIM) in the mobile terminal (MT) 51.

2) Related information may be stored in the edge enabler client 52 through a local configuration.

Figure 3A:
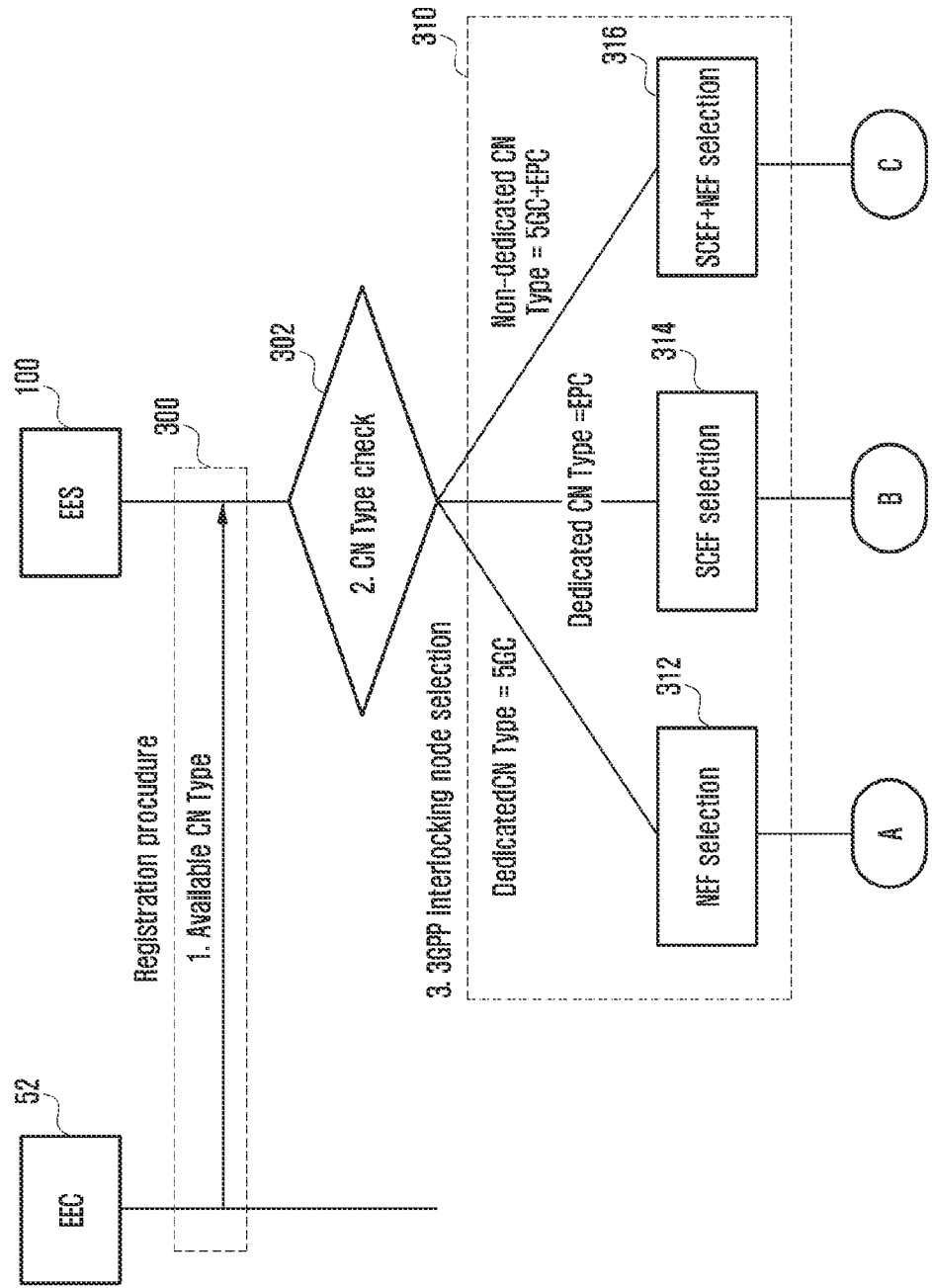
FIGS. 3A and 3B are exemplary diagrams explaining a method in which an edge enabler server identifies a UE supportable core network (CN) type according to an embodiment of the disclosure.
Figure 3B:
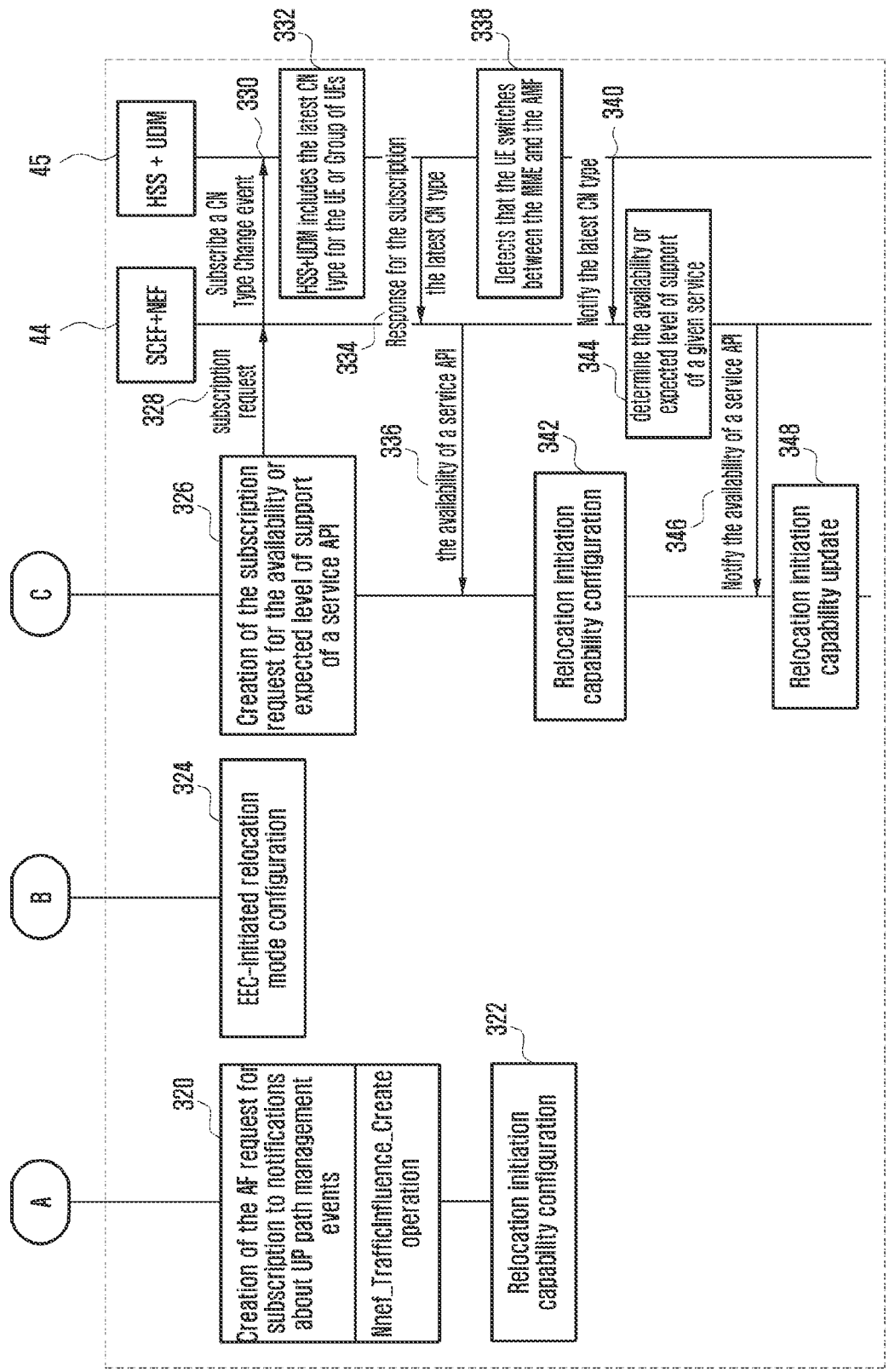

FIGS. 3A and 3B are exemplary diagrams explaining a method for identifying a supportable core network (CN) type in a procedure in which user equipment performs registration in an edge enabler server according to an embodiment of the disclosure.

FIGS. 3A and 3B may be configured as one flowchart, and it is indicated that A, B, and C of FIG. 3A are connected to A, B, and C of FIG. 3B, respectively.

The edge enabler client (EEC) 52 in the user equipment (UE) 50 may provide supportable CN type information to an edge enabler client server (EES) 100 in a registration procedure at operation 300. Accordingly, at operation 302, the EES 100 may check the supportable CN type information provided from the EEC 52. The EES 100 may perform operation 310 for selecting a wireless communication network interworking node that proceeds with operation 312, operation 314, or operation 316 in accordance with the test result at operation 302.

In an embodiment of the disclosure, the edge enabler server 100 may obtain a CN type that is supportable by the UE 50 provided by the edge enabler client 52 in the registration procedure as described above. As such information, the edge enabler client 52 may include the CN type that is supportable by the UE 50 in a registration request message, and may transfer the registration request message to the edge enabler server 100 through a 3GPP network 40. In case of the supportable CN type, the UE 50 may be provided in the form of a core network capability (e.g., UE mobility management (MM) core network capability). The core network capability provided by the UE 50 may be provided by using the core network type information to which the UE 51 is currently connected. The core network type information to which the UE 51 is currently connected may be included in UE connectivity information together with the core network capability information, and may be provided to the edge enabler server 100. The UE 50 may transfer the supportable CN type through a separate procedure except the registration procedure as described above in the disclosure. As needed, the edge enabler server 100 may send a CN type request that is supportable by the UE 50 to the edge enabler client 52.

As another embodiment of the disclosure, the edge enabler server 100 may not directly receive the CN type supportable by the UE 50 from the edge enabler client 52, but may receive the corresponding information through an edge data network configuration server 30. When proceeding with a service provisioning procedure, the edge data network configuration server 30 may obtain the CN type information supportable by the UE 50 (the CN type information or core network capability information for the network being currently connected) from the edge enabler client 52. For example, when transmitting a service provisioning request message to the edge data network configuration server 30, the edge enabler client 52 may transmit the supportable CN type together. The edge data network configuration server 30 may transfer the CN type information received through the above operation and supportable by the UE 50 to the edge enabler server 100 at a time when the UE 50 requests the service or at a time before UE 50 requests the service. The edge enabler server 100 that is a target to which the edge data network configuration server 30 transfers the CN type information may be determined as follows.

The edge enabler server for which the edge enabler client 52 is to perform the registration procedure may be the edge enabler server selected in advance by the edge data network configuration server 30 based on the location information and an IP address of the UE 50. Accordingly, the edge data network configuration server 30 may transfer the CN type information of the UE 50 to the selected edge enabler server 100.

As another method, the edge enabler server 100 may obtain the CN type information of the UE 50 through the following method. For example, the edge data network configuration server 30 may send the CN type information supportable by the UE 50 to all edge enabler servers 100 and 200 connected to the edge data network configuration server 30. As the information, the edge data network configuration server 30 may predetermine the edge enabler server 100 in which the UE 50 is to perform the registration based on the location information of the UE 50 (or edge enabler client 52) or the network state of the UE 50. When determining the transfer target, for example, the edge enabler server, the edge data network configuration server 30 may use the UE location information and UE IP address. When sending the corresponding information, the edge data network configuration server 30 may provide the edge enabler server 100 together with address and ID information of nodes (e.g., NEF, SCEF or SCEF+NEF, UDM, PCF, and SMF) to interwork with the 3GPP network that conforms to the CN type of the UE 50.

As another embodiment of the disclosure, the core network type supportable by the UE 50 can be known based on the UE IP address (or source IP address of a packet received from the UE), or a public land mobile network (PLMN) ID being used by the UE 50, or a service set identifier (SSID). The above information can be known through the service provisioning procedure through the edge data network configuration server 30 or the registration procedure between the edge enabler server 100 and the edge enabler client 52 (the corresponding information may be provided by the UE or may be locally configured).

If it is possible to identify the IP address of the UE 50 or the source IP address information of the packet sent by the UE, the edge data network configuration server 30 or the edge enabler server 100 can determine through which 3GPP core network type the UE 50 is currently connected (e.g., determination is possible through identification of which range the IP address is included in).

When transmitting the service provisioning request to the edge data network configuration server 30 or when transmitting a list of connectivity information, the edge enabler client 52 may send the PLMN ID or SSID. The edge data network configuration server 30 may identify whether the 3GPP network type corresponding to the PLMN ID is EPC dedicated, 5GC dedicated, or EPC+5GC (EPC and 5GC combined). In case that the edge data network configuration server 30 is operated by a PLMN operator, the relationship between the PLMN ID and the core network type may be locally configured.

Next, selection of the 3GPP interworking node corresponding to operation 310 will be described.

At operation 310, the edge enabler server 100 may select a device that interworks with the 3GPP network or the network function (NF) based on the CN type obtained at operation 300 and supportable by the UE 50. The edge enabler server 100 may select the NEF at operation 312, may select the SCEF at operation 314, or may select the SCEF+NEF node at operation 316. Although not exemplified in FIG. 3, the edge enabler server 100 may directly interwork with other network functions (NFs) or devices of the 3GPP other than the network exposure function (NEF) in accordance with the policy of the 3GPP network service provider or the service level agreement with the edge computing service provider.

If the UE 50 supports only the 5GC, the edge enabler server 100 may select the NEF as at operation 312. The NEF ID and address information may be given through a local configuration in the edge enabler server 100, or an actually interworking NEF may be selected (a plurality of NEFs may exist) based on S-NSSAI(s), event ID(s) supported by an application function (AF), AF instance ID, application ID, external identifier, external group identifier, or domain name. If the UE 50 supports only the EPC, the edge enabler server 100 may select the SCEF as at operation 314. Thereafter, the edge enabler server 100 may configure an EEC-initiated relocation mode at operation 324. The EEC-initiated relocation means a mode in which the EEC determines necessity of the next procedure and starts the procedure. That is, the EEC-initiated relocation means a driving mode in which the EEC 100 starts and performs a procedure for relocating UE related context (EEC related context information and application client related context information) that is stored in the EES 100 or the EAS 101.

As another example, if the UE 50 also supports the 5GC and interworking with EPC, the edge enabler server 100 may select the SCEF+NEF node as at operation 316. If the 3GPP network and the edge computing system support a common application programming interface framework (CAPIF), the edge enabler server 100 may select a CAPIF core function, and may interwork with the 3GPP network.

The CAPIF described in the disclosure may include the following functions with one network. Here, the respective functions included in the CAPIF may be implemented by one instance, may be implemented by a server, or may be a network entity. Further, the respective functions may be implemented as network functions of the mobile communication network, some functions in the network entity, or some functions of the CAPIF in the edge enabler server (e.g., API exposing function). Hereinafter, main functions of the CAPIF will be briefly described.

The main functions of the CAPIF may include a CAPIF core function, an API exposing function, and an API publishing function. The CAPIF core function may provide the CAPIF API to the edge application servers 101, 102, 103, 201, and 203. The edge application server may discover the service API that each edge application server desires to use through the CAPIF API. For this, the API provider that provides the corresponding service API may register the corresponding service API in the CAPIF core function through the API publishing function. Further, the API provider may provide the service API to the edge application server by using the API exposing function.

The CAPIF may be a system that integrally provides accesses to a northbound API of the 3GPP system. The API that can be provided in the 3GPP system may be registered in a device that belongs to the CAPIF, and the edge application server 101 may find and use the API registered through the CAPIF. As another example, the edge application server 101 may register the API that is desired to be provided to another application server in the CAPIF. Further, instead of the edge application server 101, the edge enabler server 100 or an EDN configuration server may find and provide the API registered through the CAPIF to the application server 101. Accordingly, the CAPIF core function ID and address information may have been locally configured in the edge enabler server 100, and by providing UE ID information, such as an edge enabler client ID or a generic public subscription identifier (GPSI) that is an identifier of the UE being used in the 5G system, to the CAPIF core function, the interworking may start.

In case that the UE 50 supports only the 5GC, but does not support interworking with the EPC, the edge enabler server 100 may perform interworking with the 3GPP system through the NEF at operation 320. At operation 320, the edge enabler server 100 may take information that is necessary to provide the edge computing service to the corresponding UE 50, or may perform interworking for performing an application function (AF) influence. That is, the edge enabler server 100 may perform operations, such as creation of the AF request for subscription to notifications about UP path management events, and creation of the subscription request for the availability or expected level of support of a server API for interworking. Thereafter, at operation 322, the edge enabler server 100 may configure the relocation initiation capability. For example, if it is possible to subscribe and use the UP path management events in the response to the request, the edge enabler server 100 may configure that it is possible to start the context information relocation initiation for the corresponding UE by itself.

In the disclosure, the relocation initiation capability may mean the capability of identifying whether the edge application server in the edge data network is available, whether the driving is performed in the edge hosting environment, and whether the edge application server is in an available state when the edge computing service is provided to the user equipment 50, and if not possible, triggering at least one of them to be serviceable.

In case that the UE 50 has two or more SIMs, it may perform the selection by SIMs. For example, the edge enabler server 100 may be configured to simultaneously select the NEF and the SCEF with respect to a plurality of SIMs that one UE (or one edge enabler client) has, and to perform interworking with the two functions.

Meanwhile, in case of proceeding with operations 316 to 326, the edge enabler server 100 may create the subscription request for the availability or expected level of support of a service API. Accordingly, at operation 328, the edge enabler server 100 may transmit the subscription request message to the SCEF+NEF 44. At operation 330, the SCEF+NEF 44 may provide the subscription request message received from the edge enabler server 100 to the HSS+UDM 45 as a CN type change event (subscribe a CN type change event) message.

At operation 332, the HSS+UDM 45 may find the latest CN type of the UE 50 based on the received CN type change event message for the UE 50, and may create a response message. At operation 324, the HSS+UDM 45 may provide a response message (response for the subscription) generated at operation 324 again to the SCEF+NEF 44. Accordingly, the SCEF+NEF 44, at operation 336, may provide a message including the availability of service API information to the edge enabler server 100. The operations 326, 328, 330, 332, 334, and 336 may be performed even after performing the operations 312 and 320. This is to cope with the occurrence of the change of the availability of service API caused by other events except the CN type. For example, because of the changes in the convention between the service provider and the edge computing service provider or the changes of the service provider's policy, the availability of the service API may be changed.

At operation 342, the edge enabler server 100 may perform the relocation initiation capability configuration based on the message received at operation 336.

Meanwhile, after performing operation 334, the UE 50 may detect a switch between the MME and the AMF at operation 338, and the HSS+UDM 45 may create a latest CN type notification message for the UE 50, and may provide the message to the SCEF+NEF 44 at operation 340. Thereafter, the SCEF+NEF 44 may determine the availability of a specific service to be provided to the UE 50 or an expected level of a support of a service. Based on this determination, the SCEF+NEF 44, at operation 346, may provide an availability notification of a service API message to the edge enabler server 100.

Accordingly, at operation 348, the edge enabler server 100 may perform a relocation initiation capability configuration. For example, if it is possible to use an UP path management event notifications service at operation 348, the edge enabler server may determine that context information relocation is necessary in accordance with the movement of the UE, and may start an application context relocation procedure. The application context relocation procedure is a procedure for transferring application context information stored in the edge application server that supplies the edge computing service to the UE to a new edge application server. A method in which the edge data network configuration server 30, the edge enabler server 100, or the edge application server 101 obtains the CN type related information supportable by the UE 50 in the 3GPP system will be described hereinafter.

For example, by using a UDM service such as a Nudm_SubscribeDataManagement message in the 3GPP system, it is possible to identify core network type restriction (defining whether UE is allowed to connect to 5GC and/or EPC for this PLMN) information for the UE 50 that is stored in a UDM 45a or interworking with EPS indication information. The Nudm_SubscribeDataManagement message may be a subscribe operation for obtaining information stored in the UDM 45a. While performing the subscribe operation, it is possible to immediately obtain the corresponding information by configuring an immediate reporting flag.

Figure 4:
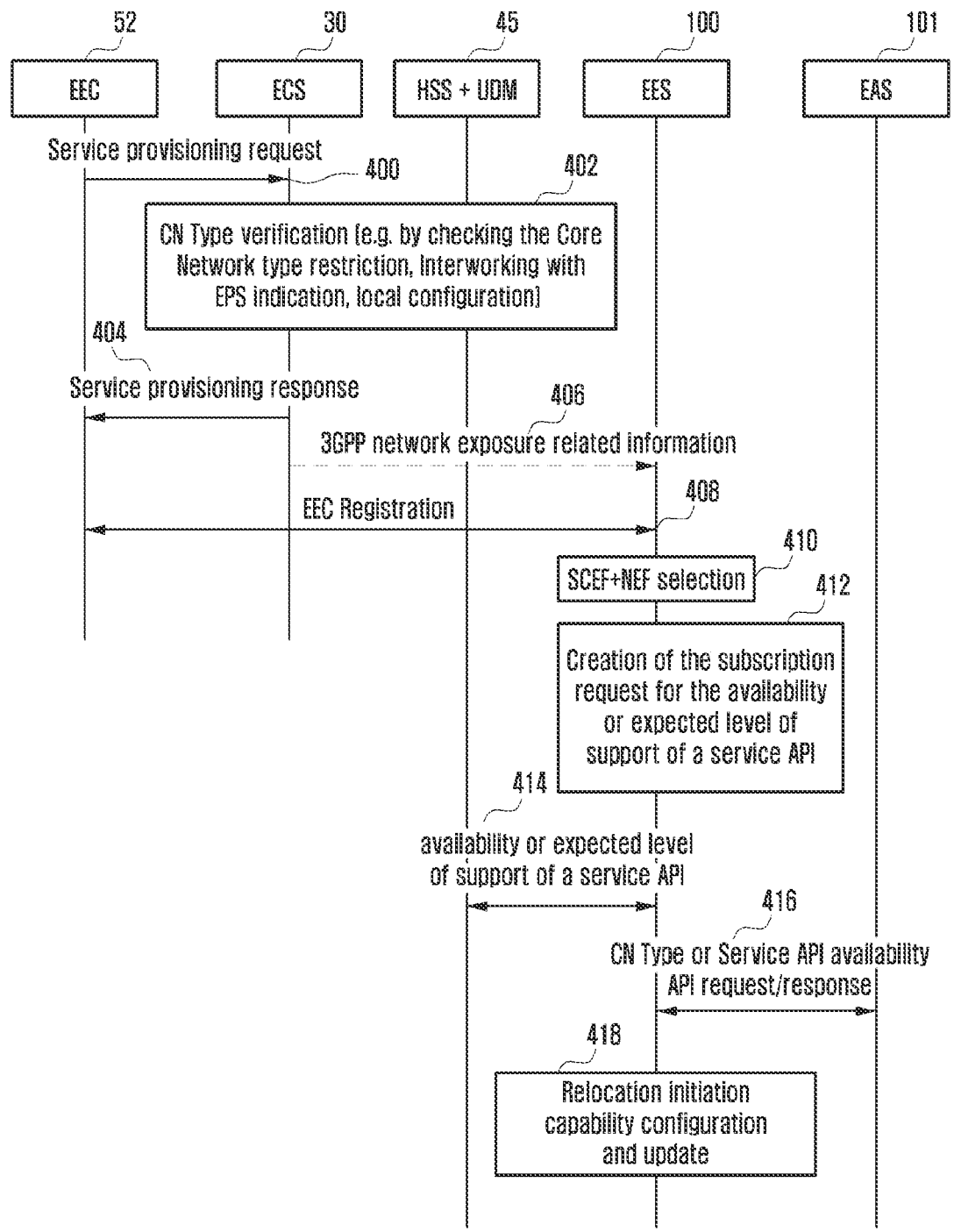
FIG. 4 is a signal flowchart explaining a case that an edge configuration server identifies a UE supportable CN type according to an embodiment of the disclosure.

FIG. 4 is a signal flowchart explaining a case that an edge configuration server identifies a UE supportable CN type according to an embodiment of the disclosure.

FIG. 4 may be an embodiment in which a UDM service is utilized by an edge data network configuration server 30.

In FIG. 4, after receiving a service provisioning request of an edge enabler client 52 at operation 400, the edge data network configuration server 30 may perform a CN type identification procedure at operation 402. The corresponding identification procedure may be performed through interworking with UDM 45a, HSS 45b, or HSS+UDM 45, which stores and manages subscription data. The corresponding interworking may be performed through a network exposure function (NEF) or a service capability exposure function (SCEF). Further, at operation 404, the edge data network configuration server 30 may generate and provides a service provisioning response message to the edge enabler client 52.

Meanwhile, as described above, at operation 406, the edge data network configuration server 30 may provide the obtained CN type related information of the UE 50 to the edge enabler server 100. At operation 406, the edge data network configuration server 30 may transfer a CN type flag or indication information obtained in the process of receiving the CN type related information of the UE 50 as at previous operation 402 to the edge enabler server 100 together with an identifier (ID) and address information of the node (NEF, SCEF, or SCEF+NEF) that interworks with the 3GPP network. If a registration message is transferred from the edge enabler client 52 of the UE to the edge enabler server 100 as at operation 408, the edge enabler server 100 having received the corresponding information may select, for example, the SCEF+NEF based on the received information at operation 410. An example of the operation 410 may correspond to operation 316 of FIG. 3. In the following description, explanation will be made on the assumption that the EES 100 selects the SCEF+NEF 44. Thereafter, the edge enabler server 100, at operation 412, may perform an operation of "creation of the subscription request for the availability or expected level of support of the service API", and at operation 414, may continuously identify the CN type of the UE 50 from the 3GPP network by sending the created subscription request to the SCEF+NEF node 44. For example, the SCEF+NEF node 44 having received the corresponding subscription request may perform the subscribe operation for a CN type change event with respect to the HSS+UDM 45, and the HSS+UDM node 45 may detect the corresponding information from an AMF (not illustrated in the drawing) or an MME (not illustrated in the drawing).

The edge enabler server 100 may provide the CN type that is identified at operation 416 to the edge application server 101. In order to perform operation 416, the edge enabler server 100 should reveal whether to provide the corresponding API to the edge application server 101. That is, as a capability exposure target, the edge enabler server 100 may use a method for exposing an available service API reporting API to the edge application server 101. For example, the edge application server 101 may perform a procedure for registering the edge application server 101 with respect to the edge enabler server 100, and may obtain an available API list in response to this. Through this, the edge application server 101 may transmit a CN type or service API availability API request message to the edge enabler server 100. A response of the edge enabler server 100 to this may include information about the CN type of the current corresponding user equipment 50 or available service API. Further, at operation 418, the edge enabler server 100 may perform relocation initiation capability configuration and update. The procedure of operation 418 may be performed after the flowchart of FIGS. 3A and 3B, or may be performed in the middle of the flowchart of FIGS. 3A and 3B. Further, as needed, operation 418 may be performed in the middle of another flowchart to be described hereinafter. However, the operation 418 will not be specifically exemplified in a specific drawing. This is because such exemplification may cause hindrance in explaining procedures of specific operations intended to be explained in the corresponding drawing.

A separate edge computing service profile may exist in UE subscription data that is stored in the 3GPP system in another method, and the CN type in which the UE 50 in the corresponding profile can use the edge computing service may have been determined. The edge computing system, for example, the edge data network configuration server 30 or the edge enabler server 100 may identify the CN type of the UE 50 by obtaining the corresponding edge computing service profile from the 3GPP system. The operation of obtaining the edge computing service profile from the edge computing system may be performed at a service authentication/authorization operation.

Figure 5:
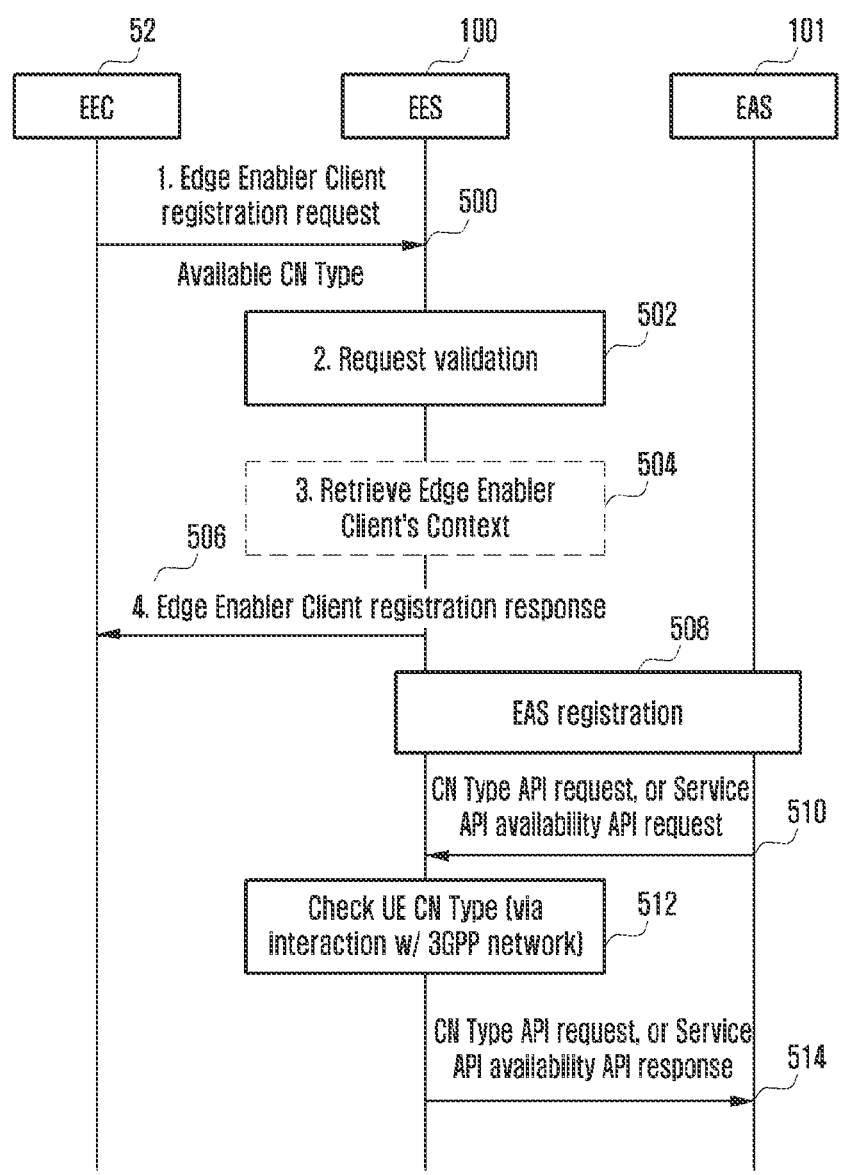
FIG. 5 is a signal flowchart in case of providing a UE supportable CN type or service API availability to an edge application server according to an embodiment of the disclosure.

FIG. 5 is a signal flowchart in case of providing a UE supportable CN type or service API availability to an edge application server according to an embodiment of the disclosure.

With reference to FIG. 5, the edge enabler client 52, at operation 500, may transmit an edge enabler client registration request message to the edge enabler server 100. In this case, the edge enabler client 52 may provide the CN type information together as much as possible. Accordingly, at operation 502, the edge enabler server 100 may perform request validation. The request validation includes the corresponding edge enabler client 52 and the user equipment 50, and authentication and authorization for the user. Further, the request validation may also be performed with respect to the supportable CN type provided by the UE. The purpose of the request validation includes validation of the corresponding UE and the user's edge computing service usage and service differentiation. Thereafter, the edge enabler server 100, at operation 504, may search and obtain context of the edge enabler client 52. As described above, the operation of searching and obtaining the context of the edge enabler client 52 may be performed with respect to another edge enabler server or the edge data network configuration server 30 having provided the service to the UE. At operation 506, the edge enabler server 100 may transmit a registration response message to the edge enabler client 52 based on the context provided from another edge enabler server or provided from the edge data network configuration server 30.

At operation 508, the edge application server 101 may perform an edge application server registration procedure with respect to the edge enabler server 100 having performed the registration procedure with the edge enabler client 52. This may be a procedure in which the edge application server 101 to provide the edge computing service to the edge enabler client 52 performs the registration in the edge enabler server 100. A case that the edge application server 101 is registered in the edge enabler server 100 may be a case that the edge application server 101 is initially mounted (or disposed or program-distributed) on the edge computing network in an area of the edge enabler server 100, and the registration procedure may be performed based on a special request or as needed. In an example of FIG. 5, although it is exemplified that operation 508 is performed after operations 500 to 506, the operation 508 may be performed in case that the edge application server 101 is initially driven before the operations, that is, regardless of the service request from the edge enabler client 52.

If the registration procedure at operation 508 is completed, the edge application server 101, at operation 510, may transmit a CN type API request message for the UE 50 or a service API availability API request message to the edge enabler server 100. Unlike the present example, the edge application server registration procedure may be performed earlier than the edge enabler client registration procedure. In this case, operation 508 may be performed earlier than operation 506.

Meanwhile, operations 510, 512, and 514 of FIG. 5 may be performed after the user equipment 50 is connected to the edge application server 101, for example, after a specific edge computing service is requested from the user equipment 50. Further, in case that the edge application server 101 knows information of the user equipment 50 to be connected to the edge application server 101, the user equipment 50 may perform operations 510, 512, and 514 in advance before the user equipment 50 requests the service. Further, operations 510 and 514 may correspond to the above-described operation 416 of FIG. 4. Accordingly, operation 418 may be performed after operation 514.

Further, operation 512 may not be performed in case that the above-described operation of FIGS. 3A and 3B is performed. Accordingly, instead of operation 512 after operation 510, operation 514 may be performed based on the information obtained at operation of FIGS. 3A and 3B.

Meanwhile, the edge enabler server 100, at operation 512, may be in a state that the UE 50 checks possibility of occurrence of CN type switching of the UE 50. Such a state may be a state where the CN type of the UE 50 is maintained. Accordingly, the edge enabler server 100, at operation 514, may generate and transfer a response message to the edge application server 101.

Meanwhile, in case that the edge enabler server 100 recognizes the possibility of the occurrence of the CN type switching while checking the possibility of the occurrence of the CN type switching of the UE 50, the edge enabler server 100 should be able to provide information about a CN type change event itself of the UE 100 or a service API availability change in accordance with the CN type change event itself. For this, the edge enabler server 100 may provide a CN type reporting API (message) or a service API availability reporting API (message) to the edge application server 101 connected to the edge enabler server 100 (having successfully performed the registration in the edge enabler server 100. A method for exposing any one of the above APIs from the edge enabler server 100 to the edge application server 101 may be directly provided, or may be performed through the CAPIF. The corresponding API providing method may support all request/response and subscription/notification models, and the reporting type may include one-time reporting or continuous reporting. The information being provided to the edge application server 101 through the CN type reporting API or the service API availability reporting API as described above may be stored for a predetermined period in the edge enabler server 100. Further, the edge enabler server 100 may update the CN type reporting API or the service API availability reporting API by periodically interworking with the mobile communication network to update the corresponding information in a predetermined period.

The method for recognizing the possibility of the occurrence of the CN type switching may be identified (determined) by using the available CN type or UE capability related information that is directly provided from the edge enabler client 52, or may be obtained by performing a procedure for acquiring the related information from the edge data network configuration server 30 (e.g., by receiving instructions from the edge data network configuration server 30 after the service provisioning procedure, or by sending a query to the edge data network configuration server 30 through the edge enabler server 100. For example, if the available CN type is the EPC+5GC, or if the EPC NAS and the 5GC NAS in the UE capability can be simultaneously supported, the edge enabler server 100 should identify the service API availability, and may provide the corresponding information to the edge application server 101.

The service API availability reporting API according to the disclosure may be used even in a state where the information about the CN type of the user equipment 50 is not transferred in advance to the edge enabler server 100. For example, in case that the edge enabler server 100 having no information about the supportable CN type for the user equipment 50 or the current CN type of the user equipment 50 in advance performs the service API availability reporting API request from the edge application server 101, the following operation may be performed.

The edge enabler server 100 may directly request the UE supportable CN type from the edge enabler client 52, or may obtain the corresponding information through the 3GPP system. According to the method for obtaining the corresponding information through the 3GPP system, after performing the "creation of the subscription request for the availability or expected level of support of a service API", the edge enabler server 100 may receive the CN type of the current UE 50 or the available service API by using an immediate reporting flag in event reporting information while sending the subscription request to the NEF+SCEF 44. Further, in case that the 3GPP system uses a common API framework (CAPIF), the edge enabler server 100 may receive the service API information from the CAPIF (may receive the service API information through the availability of service APIs event notification or a service discover response) by providing the subscription request to a CAPIF core function device (not illustrated in the drawing) or the NF (not illustrated in the drawing) that performs the corresponding function.

Based on the obtained information related to the service API availability, the configuration related to the application context relocation initiation capability may be updated, and the corresponding update may be provided to the edge enabler server 100 (the edge application server registration operation can be utilized). For example, as the CN type of the UE 50 is switched from the 5GC to the EPC, UP path management event notifications are unable to be used, and accordingly, the edge enabler server 100 and the edge application server 101 may configure that an application context relocation initiation/trigger in accordance with the movement of the UE 50 is unable to be supported. Thereafter, the edge enabler server 100 and/or the edge application server 101 may perform activation and/or deactivation of the application context relocation initiation/trigger operation of the edge enabler client 52.

Figure 6:
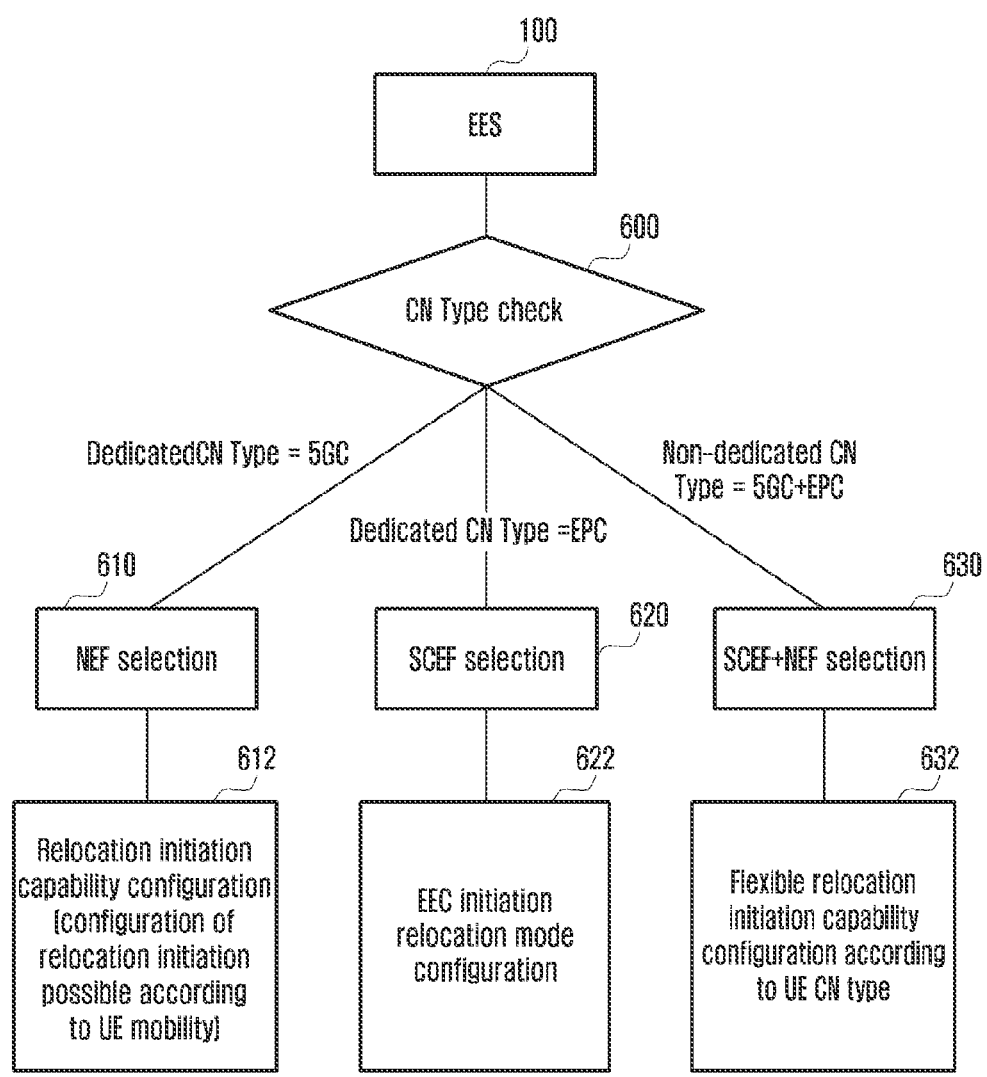
FIG. 6 is a flowchart explaining a case of selecting an application context relocation related service in an edge computing system in accordance with a UE supportable CN type according to various embodiments of the disclosure.

FIG. 6 is a flowchart explaining a case of selecting an application context relocation related service in an edge computing system in accordance with a UE supportable CN type according to various embodiments of the disclosure.

At operation 600, the edge enabler server 100 may check the CN type information as shown in FIG. 3 as described above. Such checking may use information received from the edge enabler client 52 or received from the edge data network configuration server 30. If the UE 50 is unable to support the 5GC, and support only the EPC (dedicated CN type=EPC) as the result of checking at operation 600, the edge enabler server 100 may proceed to operation 620 to select the SCEF, and since the UP path management event notifications service is unable to be used, the edge enabler server 100. At operation 622, configures so that the edge enabler client 52 can start the application context relocation procedure.

If the UE supports only the as the result of checking at operation 600, the edge enabler server 100 may proceed to operation 610 to select the NEF, and may grasp whether the UP path management event notifications and the AF influence on traffic routing are available (in case of supporting the CAPIF, the above matter may be identified through the CAPIF core function) by identifying the service level agreement between the edge computing service provider that provides the edge enabler server 100 and the 3GPP service provider. In case that the UP path management event notifications can be utilized, the edge enabler server 100, at operation 612, may prevent the edge application server 101 from performing the subscription operation for the up path management event notifications service in duplicate, or may perform unsubscribe for the corresponding service of the edge application server 101. As another scheme, the edge enabler server 100 may be configured to perform triggering of the application context relocation procedure by utilizing the UP path management event notifications. As still another example, operation 612 612 may be replaced by operation 320 to operation 322 as described above in FIG. 3B, or at least some of operation 320 and operation 322 may be performed.

In case that EPC-5GC switching of the UE 50 is able to be generated, that is, if the SCEF+NEF node is selected as at operation 630, the edge enabler server 100, at operation 632, should perform the "creation of the subscription request for the availability or expected level of support of the service API" operation (with respect to the SCEF+NEF), or should perform monitoring of the current CN type of the UE through interworking with the CAPIF core function (availability of service APIs event notification or service discover response). For example, the edge enabler server 100 may obtain the available service API related information for the UE by performing an operation, such as "Nnef_APISupportCapability_Subscribe service operation", and may perform notification of the related information even to the edge application server 101. Operation 632 after operation 630 may be configured to perform at least some or all of operation 326 to operation 348 as described above with reference to FIG. 3B. Further, if operation 326 is performed in relation to FIG. 5, all or at least some of operation 326 to operation 348 may be performed at operation 512.

In case that CN type switching of the user equipment 50 occurs from the EPC to the 5GC, the edge enabler server 100 should perform an operation for using an NEF service (e.g., Nnef_Exposure service) by selecting the NEF. For this, the NEF ID and the address are necessary. The corresponding information may be given through local configuration in the edge enabler server 100, and the NEF selection may be performed based on S-NSSAI(s), event ID(s) supported by AF, AF instance ID, application ID, external identifier, external group identifier, or domain name. Further, in order to obtain information necessary to service the corresponding UE, interworking with the UDM 45a may be necessary. For this, in order to perform UDM selection, the edge enabler server 100 may consider a home network identifier (e.g., MNC and MCC) of a subscription concealed identifier (SUCI)/subscription permanent identifier (SUPI) and UE's routing indicator, UDM group ID of the UE's SUPI, SUPI or internal group ID, GPSI, or external group ID. After selecting the NEF, the edge enabler server 100 may identify whether the AF influence and the UP path management event notifications are available, and based on this, the edge enabler server 100 may reconfigure an application context relocation initiation mode, or may configure a method for performing application data traffic re-routing in accordance with the application context relocation.

In case that CN type switching of the UE 50 occurs from the 5GC to the EPC, the edge enabler server 100 is unable to use the AF influence and the UP path management event notification service that can be provided by the 5GC through the NEF, and thus modification and related procedure change of an application context relocation initiation mode may be required. For example, the edge application server 101 and the edge enabler server 100 should perform unsubscribe for the UP path management event notification, and if the application context relocation initiation of the edge enabler client 52 should be deactivated, the corresponding function of the edge enabler client 52 should be activated (the activation is possible through an edge enabler client registration update procedure or a separate notification procedure). Further, the edge enabler server 100 should change he node that interworks with the 3GPP system to the SCEF. The SCEF ID and the address may be given through the local configuration of the edge enabler server 100.

Since changes of devices that initiate the application context relocation procedure and related trigger conditions are accompanied in accordance with the CN type switching of the UE 50 between the 5GC and the EPC, the edge enabler server 100 may have changes of devices that should send an application context relocation in-progress indication. For example, if the UE goes from the 5GC to the EPC in a situation in which the edge application server 101 uses the UP path management event notifications, the edge enabler server 100 may configure not to send the application context relocation in-progress indication even to the edge application server 101.

Necessary operations in the edge application server 100 related to FIG. 6 as described above are as follows.

- Operation for obtaining CN type or available service API related information of the user equipment 50
- Performing of a CN type or available service API reporting API request/subscription operation for the user equipment 50 in the edge enabler server 100
- The edge enabler server 100 performs a request for reception from the CAPIF core function through the availability of service APIs event notification or service discover response.
- Direct request for related information from the 3GPP network (obtaining of related information through SCEF, NEF, or SCEF+NEF): In case that a service provider of the edge application server is the 3GPP network service provider, or there is a related service level agreement, the edge enabler server 100 may directly receive the CN type related information of the UE 50 from the UDM 45a or the HSS 45b without passing through the network exposure function, or may obtain the service API related information from the network function, such as the SMF or the PCF.
- After obtaining the CN type or available service API information of the user equipment 50, the edge application server 101 performs application context relocation initiating capability reconfiguration and related information update (edge application server registration update procedure can be utilized) in the edge enabler server.
- Example 1) When switching from the 5GC to the EPC occurs in the UE 50, the edge application server 101 performs unsubscription and reconfigures the application context relocation initiation possible conditions (configures initiation impossible according to the UE mobility) according to non-available UP path management event notifications. The edge application server 101 may notify the edge enabler server 100 of the performed related reconfiguration matters (application context relocation start impossible according to the mobility), and may support so that the edge enabler server 100 can update an application context relocation mediation procedure. Further, since the AF influence on traffic routing is unavailable, it is required for the edge enabler server 100 to perform the corresponding operation, or it is required for the edge enabler client 52 to perform application data traffic rerouting. For this, the edge application server 101 may notify the edge enabler server 100 that its rerouting can be performed (this may be possible through utilization of the edge application server registration procedure; registration type=update), and may perform notification of even the edge enabler client 52 through the edge enabler server 100.
- Example 2) if it is not possible to receive available service API related information from the 3GPP network in accordance with the CN type change of the user equipment 50, an available service API reporting API request/subscribe operation may be performed with respect to the edge enabler server 100 for the reception through the edge enabler server 100.

Operations according to various embodiments will be described, in which the user equipment 50 selects the NEF, SCEF, or NEF+SCEF node in the edge enabler server 100 or the edge configuration server 30 based on the currently connected core network type information by utilizing operation 400 and operation 500 as described above.

First Embodiment: A Method in which the User Equipment (UE) 50 Selects the NEF/SCEF/NEF+SCEF Based on the Currently Connected Core Network Type Report As described above, at operation 400 of FIG. 4 (service provisioning request: EEC→ECS (30)) and operation 500 of FIG. 5 (EEC registration request: EEC→EES (100)), the available CN type information may include currently connected core network type information. The user equipment 50 may include the currently connected CN type information in UE connectivity info to be transferred to the EES100 and 200 or the ECS 30. The user equipment connectivity information may also include a PLMN ID to which the user equipment 50 is currently connected or is connectable, or UE mobility management (MM) core network capability (e.g. whether to support the EPC/5GC NAS, and whether to support the EPC/5GC interworking).

This will be specifically described as follows. Further, in the following description, in order to explain the operations in the EES 100 and/or the ECS 30, the "EES/ECS" form will be described. This means that the operation may be performed in the EES 100, or may be performed in the ECS 30. Further, as needed, the description of the EES/ECS may include a case that both the EES 100 and the ECS 30 perform the operation to be described hereinafter.

First, the user equipment 50 may be aware of the currently selected core network type based on a NAS signaling connection mode. For example, the user equipment 50 may identify whether the mode is an S1 mode connected to the EPC or an N1 mode connected to the 5GC. The EEC 52 of the user equipment 50 may be provided with the above information, that is, whether the mode is the S1 mode or the N1 mode, from the mobile terminal (MT) 51.

Second, the user equipment 50 may provide interworking capability info, for example, information on whether to support the mobility between the EPC and the 5GC together with connected core network (CN) type information at operation 400 or operation 500 as described above. Further, the user equipment 50 may additionally provide the PLMN ID together.

Third, the EES/ECS may select the NEF 44a or the SCEF 44b based on the above information provided from the user equipment 50. Here, a case where the EES 100 is driven may correspond to a case of operation 500, and a case where the EEC is driven may correspond to a case of operation 400. The EES/ECS may be selected by using the following criteria when the NEF 44a or the SCEF 44b is selected.

(A) Type (EPC, 5GC, or EPC+5GC) information of the network corresponding to the PLMN ID accessed by the user equipment 50 is configured to the EES 100 or the ECS 30, and thus the network may be identified and the network type may be determined based on the PLMN ID. In addition, the user equipment 50 may select a request message provided at operation 400 or operation 500 based on the source IP address of the request message. The relationship between the range of the packet source IP address and the NEF 44a/SCEF 44b/NEF+SCEF 44 may be mapped onto the ECS 30 or the EES 100 in advance.

(B) If the connected core network (CN) type to which the user equipment 50 is connected is the EPC, the SCEF 44b or the NEF+SCEF 44 may be selected. The network to which the user equipment 50 is connected may be identified by the PLMN ID. Accordingly, if the connected network supports the EPC-5GC interworking, and the user equipment 50 supports the mobility between the EPC and the 5GC, the EES/ECS may select the NEF+SCEF 44.

(C) If the connected core network (CN) type to which the user equipment 50 is connected is the 5GC, the EES/ECS may select the NEF 44a or the NEF+SCEF 44. The network to which the user equipment 50 is connected may be identified by the PLMN ID. Accordingly, if the connected network supports the EPC-5GC interworking, and the user equipment 50 supports the mobility between the EPC and the 5GC, the EES/ECS may select the NEF+SCEF 44.

Fourth, if the NEF+SCEF 44 is not selected, the EES/ECS may identify interworking possibility, core network (CN) type restriction included in UE subscription information, availability of EPC connectivity, UE indication of ECP preferred network behavior, and supported network behavior in interworking with the HSS 45b or the UDM 45a through the selected NEF 44a or the SCEF 44b, and may determine whether to reselect the node of the NEF+SCEF 44. In case that only one network connection between the EPC or 5GC networks is allowed through the CN type restriction, the NEF+SCEF 44 may not be selected, but only the NEF 44a or the SCEF 44b may be selected. In addition, the EES/ECS may consider at least one of the following matters.

(A) The EES/ECS may be determined based on the PLMN ID accessed by the user equipment 50. The EES/ECS may be configured with the CN type information of the PLMN corresponding to the PLMN ID. Further, exposure function information corresponding to the PLMN may be given. That is, the PLMN that coincides with the PLMN ID in the user equipment connectivity information may be chosen, and the exposure function supported by the PLMN (installed in the PLMN) may be selected. Information necessary for the selection may be configured inside the EES/ECS as follows. In the EES, the PLMN ID and the core network type information of the corresponding PLMN or information about the exposure function (IDs and addresses of the NEF 44a, SCEF 44b, or NEF+SCEF 44) or API termination point for each service may be mapped and locally configured. In case that the interworking method supported by the EES/ECS in the PLMN directly interworks with a specific node of the core network or a specific network function (e.g., PCF, SMF, AMF, UDR, or UDM) of the core network without passing through the NEF 44a, SCEF 44b, or NEF+SCEF 44, information (SMF, AMF, and PCF IDs and addresses) about the interworking target network function or the API termination point for each service may be mapped and configured onto the PLMN ID and the exposure event/service.

(B) The EES/ECS may configure the criteria for selecting one of the NEF 44a, SCEF 44b, or NEF+SCEF 44 based on the location information of the user equipment 50. In case that a service area of the exposure function is configured, the exposure function that is close to the location of the user equipment 50 may be selected.

Fifth, if the NEF+SCEF 44 is configured, the EES/ECS may perform the operation of FIG. 3 and operations 412 and 414 of FIG. 4 for service API availability monitoring. Further, the EES/ECS may request the UDM 45a to subscribe for the service API availability change in accordance with the CN type change event or the CN type change of the corresponding user equipment.

Second Embodiment: A Method for Selecting One of NEF/SCEF/NEF+SCEF Based on UE Capability of the User Equipment (UE) 50 and the PLMN Information Configured in the EES/ECS First, it is possible to provide the EES/ECS with information related to UE mobility management (MM) CN capability of the user equipment 50 (operation 500 that is an EES registration request operation/operation 400 that is a service provisioning request operation).

Second, the EES/ECS may interwork with the SCEF 44b in case that information provided from the user equipment 50 is EPC only, and may interwork with the NEF 44a in case that the information is 5GC only.

Further, if the information provided from the user equipment 50 is EPC+5GC, the EES/ECS may select the exposure function through various methods as follows.

A. The EES/ECS may choose the NEF+SCEF 44 in accordance with the policy locally configured to the EES/ECS (exposure function information configured based on the UE ID or PLMN ID), or B. The EES/ECS requests the CN type information connected to the user equipment 50. Thereafter, the EES/ECS may operate as in the first embodiment as described above based on the CN type information received from the user equipment 50.

C. The EES/ECS optionally selects the NEF 44a or SCEF 44b, and requests user equipment (UE) information from the network based on the UE ID. If the user equipment information is unable to be identified in the optionally selected network, the user equipment information (e.g., UE subscription information) may be obtained by selecting another network (exposure function), and the fourth operation of the first embodiment as described above may be performed.

D. Further, the EES/ECS may perform judgment (identification or determination) based on eth source IP address for the request message of operation 400 or 500 of the user equipment 50. During such judgment (identification or determination), the relationship between the range of the packet source IP address and the NEF 44a/SCEF 44b/NEF+SCEF 44 may be mapped in advance onto the ECS 30 (or EES 100).

Third Embodiment: A Method for Selecting NEF/SCEF/NEF+SCEF Based on the UE ID of the User Equipment 50

In FIG. 4, the ECS 30, at operation 400, may receive the service provisioning request from the edge enabler client 52, and then may perform the CN type identification procedure based on the UE ID included in the service provisioning request. The corresponding identification procedure may be performed through interworking with the UDM 45a, HSS 45b, or HSS+UDM 45 in which the ECS 30 stores and manages the subscription data. Such interworking, that is, interworking between the ECS 30 and the UDM 45a or between the ECS 30 and the HSS+UDM 45 may also be performed through the network exposure function (NEF) 44a or the service capability exposure function (SCEF) 44b. The ECS 30 may optionally select one of the NEF 44a and the SCEF 44b based on partial operations of the first embodiment or the second embodiment as described above, and then may select and interwork with another exposure function based on whether the corresponding user equipment 50 can be identified or UE subscription information of the corresponding user equipment 50. When interworking with the NEF 44*a*, the ECS 30 may transmit the subscribe request for the CN type change event of the corresponding user equipment to the UDM 45*a* through the NEF 44*a*. In this case, when transmitting the subscribe request for the CN type change event to the NEF 44*a*, the ECS 30 may receive information about the UE CN type of the current user equipment 50 by configuring an immediate reporting flag. Further, the ECS 30 may select the NEF+SCEF 44 in the reselection process. When interworking with the NEF+SCEF 44, the ECS 30 may perform the subscribe request for the CN type change event of the corresponding user equipment from the UDM 45*a*.

At operation 500, the EES 100 may receive the EEC registration request from the edge enabler client 52, and then may perform the CN type identification procedure based on the UE ID included in the EEC registration request. Such an identification procedure may be performed through interworking with the UDM 45*a*, HSS 45*b*, or HSS+UDM 45, which stores and manages the subscription data. The interworking between the EES 100 and the UDM 45*a* or between the ECS 30 and the HSS 45*b*, or between the ECS 30 and the HSS+UDM 45 may be performed through the network exposure function (NEF) 44*a* or the service capability exposure function (SCEF) 44*b*. The EES 100 may optionally select one of the NEF 44*a* and the SCEF 44*b* based on partial operations of the first embodiment or the second embodiment as above, and then may select and interwork with another exposure function based on whether the corresponding user equipment 50 can be identified or UE subscription information of the corresponding user equipment 50. When interworking with the NEF 44*a*, the EES 100 may transmit the subscribe request for the CN type change event of the corresponding user equipment to the UDM 45*a* through the NEF 44*a*. When transmitting the subscribe request for the CN type change event of the corresponding user equipment, the EES 100 may receive information about the UE CN type of the current user equipment 50 by configuring an immediate reporting flag. The EEC 100 may select the NEF+SCEF 44 in the reselection process. Further, when interworking with the NEF+SCEF 44, the EES 100 may perform the subscribe request for the CN type change event of the corresponding user equipment from the UDM 45*a* through the NEF+SCEF 44. As another example, in case that the ECS 30 performs the NEF/SCEF/NEF+SCEF selection process through the service provisioning operation, the EES 100 may obtain (receive) the NEF/SCEF/NEF+SCEF information corresponding to the user equipment from the ECS 30 by using the user equipment identifier (UE ID).

Further, the edge application server (EAS) may obtain the UE ID, and may select the exposure function for direct interworking with the 3GPP network. For this, the EAS may perform the CN type identification procedure by using at least one of methods as described above based on the UE ID. If the EAS interworks with the NEF+SCEF 44, the EAS may perform the subscribe request for the CN type change event of the corresponding user equipment from the UDM 45*a*.

In the first to third embodiments as described above, if the network type of the PLMN is the 5GC, and supports the direct interworking, the EES/ECS or the EAS may not only select the NEF 44*a*, SCEF 44*b*, and NEF+SCEF 44, but also directly select the 3GPP network node (e.g., PCF, NWDAF, AMF, and SMF) for direct interworking.

The ECS 30 may provide, to the EES 100, information about the exposure function selected at service provisioning operation of the edge enabler client 52 and the edge configuration server 30, for example, IDs, address information, and supported service API of the NEF 44*a*, SCEF 44*b*, or NEF+SCEF 44, and thus repeated exposure function selection procedure can be reduced. The ECS 30 may push the information to the EES 100 by using the user equipment identifier (UE ID), or as needed, the EES 100 may pull the information from the ECS 30. The time when the EES 100 requests the corresponding information from the ECS 30 (or request time or in case of requesting) may be in or after performing the EEC registration operation, or in or after performing the EAS discovery operation. Further, in case that the EAS 101 directly selects the exposure function, and direct interworking with the 3GPP network is necessary, the exposure function obtained by the EES 100 may be obtained (provided) and used (the exposure function selection may be performed for each user equipment).

In case of supporting the CAPIF, the EES/ECS may determine interworking with the 3GPP network through the CAPIF core function. The corresponding PLMN (PLMN identified by the PLMN ID) may have configured information on whether to support the CAPIF and CAPIF core function information (address and ID) to the EES 100 or the ECS 30. In this case, the EES 100 or the ECS 30 may select the CAPIF core function to be interworked based on the PLMN ID.

After selecting the interworking method with the 3GPP and the interwork network function as described above, the edge enabler server 100 obtains an available service APO list, and then may complete a service API list that can be provided to the edge application server having been registered in the EES 100 or proceeding with the registration. For example, related operations are as follows.

The edge enabler server 100 may be provided with an edge application server profile from the edge application server 101 through an edge application server registration operation. Further, the edge enabler server 100 may prepare the list (available service APIs) through selection of the service API that can be provided from the EES 100 among EAS required service APIs in the edge application server profile (the service API list required for the corresponding EAS to provide the service to the app client in the user equipment). The EES 100 may transfer the prepare available service API list to the edge application server 101. The method for transferring the corresponding information from the EES 100 to the EAS 101 may include the corresponding information in the edge application server registration response message as described at operation 508 of FIG. 5, or may carry and transfer the corresponding information on a response/notification message through a separate available service API reporting API. In case of transferring the available service API list prepared by the EES 100 through the edge application server registration response, in addition of the available service API information as the service API information, whether to support the CAPIF and the CAPIF core function information (addresses and IDs) may be transferred together. The available service API information may differ depending on the user equipment. The edge application server 101 may notify the edge enabler server 100 of the user equipment identifier, and may be provided with the available service API information for the corresponding user equipment 50.

In addition to the above application contest relocation related procedure and the initiation/trigger condition update, the QoS provisioning operation may also be affected by the CN type change. The edge application server 101 or the edge enabler server 100 may configure related parameters of the method for provisioning the QoS requirement required for the edge computing service in consideration of the QoS model supported by the CN type Edge. Further, the guaranteed QoS condition may also differ according to the CN type of the UE 50. In consideration of this, the edge enabler server 100 or the edge application server 101 may perform a comparison operation or the like whether the QoS that can be provided to application clients 53, 54, and 55 in the UE 50 satisfies the application KPI requirements.

The above embodiment has been prepared around the interworking operation between the 3GPP 5GC and the EPC. However, the disclosure may include all of edge computing service providing method according to the radio access network or the radio access technology type in addition to the core network in the 3GPP system. Further, the network function for exposing information (UE related information) necessary for the edge computing service in the 3GPP system is not limited to the SCEF 44b or the NEF 44a. The network function, such as the PCF or SMF, may be directly exposed to the edge computing system. Further, the device in the edge computing that directly receives the exposed information is not limited to the edge enabler server. The edge application server or the edge data network configuration server can directly obtain and use the user equipment related information exposed through the 3GPP system. That is, the subjects of the operations may be the edge application server and the edge data network configuration server in addition to the edge enabler server.

The CN type related information of the UE 50 mentioned in the disclosure may be a network type restricted by the network type supportable by the UE itself and the 3GPP network policy, or the UE subscription. Further, the CN type related information of the UE 50 includes information that can determine the CN type of the UE, such as core network type restriction (e.g., due to lack of roaming agreements), availability of EPC connectivity, UE indication of EPC preferred network behavior, or supported network behavior.

The information that can be obtained through the 3GPP service API mentioned in the disclosure includes all UE related information that can be provided by the 3GPP system. For example, not only the UE location and UE identifier used in the 3GPP system but also information about the network function for servicing the UE, communication service quality (QoS) being provided to the UE, and information about the policy being applied to the UE may be provided to the edge computing service through the corresponding service API.

Next, a method for providing type related information of the user equipment (UE) to an edge computing server will be described. Hereinafter, features to be viewed are as follows.

A method for providing type related information of user equipment (UE) to a specific server in an edge computing network or a specific server in the edge computing network A method for selecting an edge enabler server (EES) 100 and 200 or an edge application server (EAS) 101, 102, 201, and so forth based on the type of the UE A method for detecting occurrence of a change of the type information of the UE and coping with such a change in an edge computing system (or network)

Figure 7:
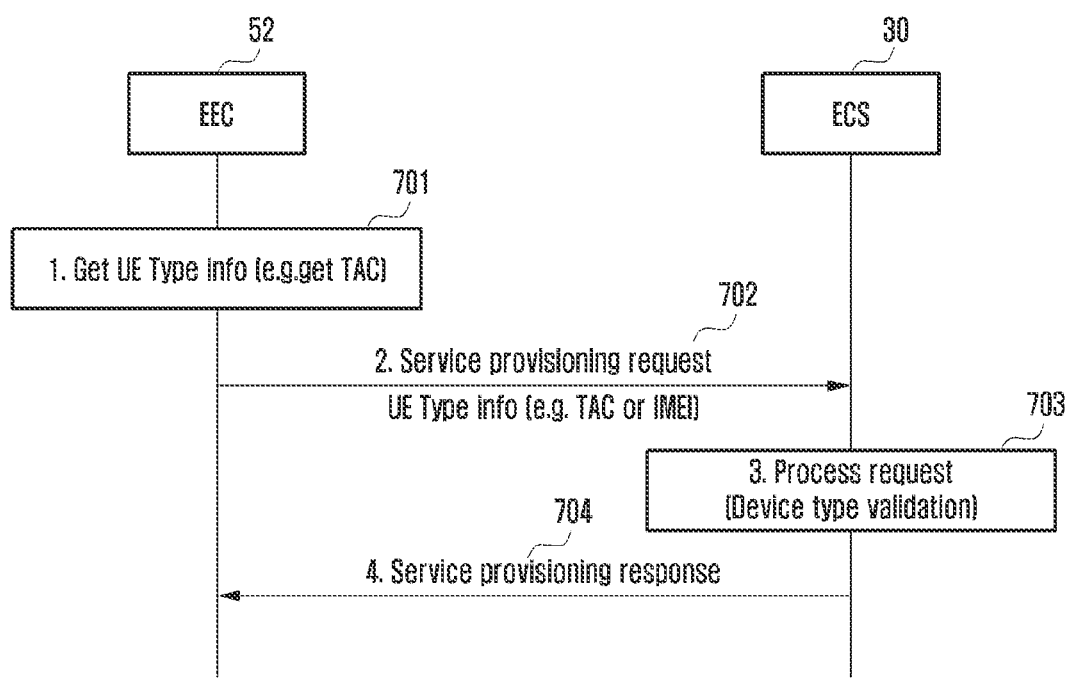
FIG. 7 is a flowchart explaining a case that a UE transmits type information to an edge data network according to various embodiments of the disclosure.

FIG. 7 is a flowchart explaining a case that a UE transmits type information to an edge data network according to various embodiments of the disclosure.

At operation 701, the EEC 52 of the UE 50 may obtain the UE type information in the UE. For example, the EEC 52 may obtain a type allocation code (TAC) capable of representing the UE type information or an international mobile station equipment identity (IMEI) in the UE. In case of the UE in which an android operating system is installed, the EEC 52 may extract a TAC value from an IMEI value by utilizing "getTypeAllocationCode function" through the API provided by a telephony manager in an android application framework.

At operation 702, the EEC 52 may provide the UE type information (TAC value) obtained in the UE to the ECS 30 through a service provisioning request message. If the UE does not provide the UE type information at operation 702, the ECS 30 may request the corresponding information from the UE 50, and may receive the UE type information in response to this. As another example, the ECS 30 may be provided with the UE type information from the 3GPP network.

At operation 703, the ECS 30 may identify the UE type based on the information provided from the UE 50, that is, from the EEC 52, and may judge (identify or determine) whether the edge computing service can be provided. For example, if the TAC value is received from the UE 50, a method for identifying the UE type from the TAC value may be, for example, as follows.

Relationship information between the TAC value and the UE type may be preconfigured (locally configured) in the ECS 30. An another method, information about the UE dedicated EES having a specific TAC value, for example, information about the first EES 100 of the edge data network 1 110 may be predetermined in the ECS 30. Here, as described above, the UE dedicated EES having the specific TAC value may be a UE dedicated EES mounted on a vehicle or integrated with the vehicle, or a specific service dedicated EES. In the ECS 30, information of such dedicated EES may be mapped onto the supportable UE type information in the EES profile or the TAC value representing the type information to be stored.

In order to identify the TAC value, the ECS 30 may identify the UE type by accessing an external TAC database server (not illustrated in the drawing). For example, the specific service dedicated TAC application may be provided from the TAC database server.

At operation 704 after operation 703, the EES information corresponding to the UE type and information required to create a session to an EDN in which the corresponding EES is present (exists) may be provided to the EEC 52 of the UE 50. If it is determined that the edge computing service is not enabled based on the UE type at operation 703, the corresponding provisioning failure and cause message in the service provisioning response message may be transferred to the EEC 52 of the UE.

Figure 8:
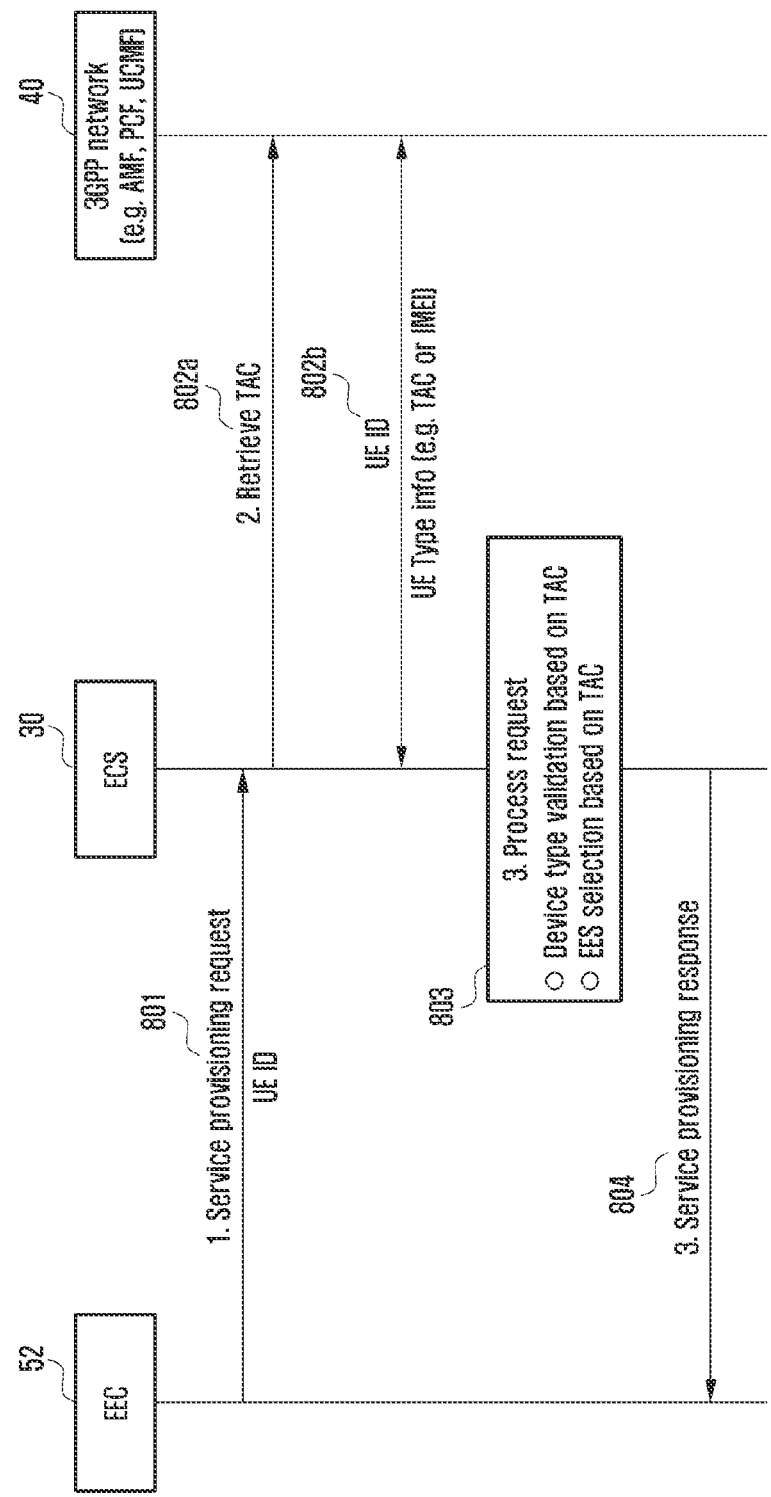
FIG. 8 is a control flowchart explaining a case that a mobile communication network provides UE type information according to various embodiments of the disclosure.

FIG. 8 is a control flowchart explaining a case that a mobile communication network provides UE type information according to various embodiments of the disclosure.

At operation 801, the EEC 52 of the UE 50 may provide the ID of the UE, such as a generic public subscription identifier (GPSI), when transmitting a service provisioning request message. In such a message transmission, the MT 51 actually processes the message in the form of a communicable signal or message in the mobile communication network 40, and may provide the ECS 30 of the edge data network through the mobile communication network 40. In the signal flow of FIG. 8, only actual transmission subject and reception subject are exemplified for convenience in explanation.

At operation 802, the ECS 30 may obtain the type information of the UE, for example, the IMEI or the TAC, in interworking with the mobile communication network, for example, the 3GPP network 40, by utilizing the UE ID provided from the EEC 52 of the UE. The interworking method at operation 802 may use one of the following operations.

First, the type information of the UE may be stored in, for example, a UE radio capability management function (UCMF) device that is one of network function (NF) devices of the 3GPP network 40. Accordingly, the ECS (30) may transfer the IMEI or the TAC obtained by using the ID of the UE obtained from the UE 50 to the UCMF of the 3GPP network 40 at operation 802*a*. Then, the UCMF of the 3GPP network 40 may obtain the UE type information of the corresponding UE by using the IMEI or the TAC of the UE 50. Accordingly, the UCMF of the 3GPP network 40 may transfer the IMEI or the TAC of the UE 50 to the ECS 30 together with the UE type information.

As another example, the type information of the corresponding UE may be stored in at least one of an access and mobility function (AMF) device of the 3GPP network 40, a policy and charging function device, a unified data management (UDM) device, or a unified data repository (UDR). In this case, the ECS 30 may transfer the IMEI or TAC obtained by using the ID of the UE obtained from the UE 50 to any one of the above-described devices. Then, in the same method as described above, the corresponding network function device may obtain the UE type information of the corresponding UE by using the IMEI or the TAC of the UE 50. Accordingly, the corresponding function device of the 3GPP network 40 may transfer the IMEI or the TAC of the UE 50 to the ECS 30 together with the UE type information.

In this case, the network function device of the 3GPP network may select whether to provide only the TAC value or all the IMEI values depending on the provider of the ECS 30. For example, if the provider of the ECS 30 is the 3GPP network service provider, the network function device of the 3GPP network 40 can trust the ECS 30 (since the MIEI value is not exposed to an outside), and may provide the entire IMEI values at operation 802*b*. In contrast, if the provider of the ECS 30 is not the 3GPP network service provider, but is the edge computing service provider, the network function device of the 3GPP network 40, at operation 802*b*, may provide only the TAC value of the UE to the ECS 30. Further, if there is an agreement between the service providers even in case that the provider of the ECS 30 is not the 3GPP network service provider, the network can be recognized as a reliable network, and thus the network function device of the 3GPP network 40 may provide the entire IMEI values at operation 802*b*.

At operation 803, the ECS 30 may select the EES 100 and 200 as follows by utilizing the TAC value provided from the 3GPP network 40.

Relationship information between the TAC value and the UE type may be preconfigured (locally configured) in the ECS 30. As a different method or in addition to the above case, a UE dedicated EES having a specific TAC value may be configured in the ECS 30. If the UE dedicated EES is configured in the ECS 30 as described above, supportable UE type information may be mapped onto the TAC value, and may be stored in the EES profile. The EES profile information stored by the ECS 30 may be provided to the ECS 30 through an EES registration to ECS procedure. This will be further described with reference to FIG. 10 to be described later.

As another method, in order to identify the TAC value, the ECS 30 may identify the UE type by accessing an external TAC database server. This procedure is not exemplified in FIG. 8.

After identifying the UE type, the ECS 30 may determine whether to support the edge computing service.

At operation 804, the ECS 30 may include information about the EES selected through operation 3 in a service provisioning response message to be provided to the EEC 52 of the UE 50.

Figure 9:
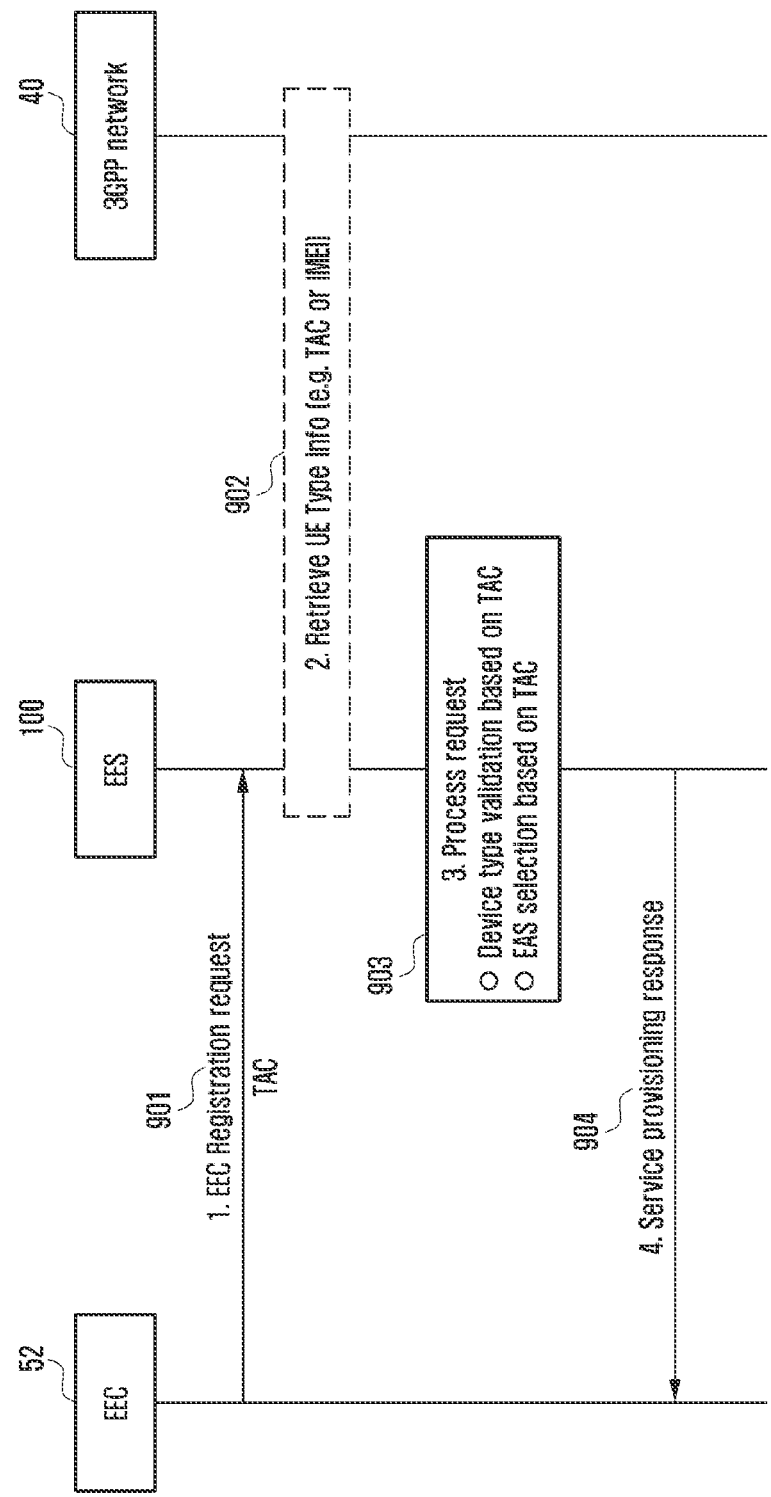
FIG. 9 is a signal flowchart in case of selecting an edge application server based on UE type information according to various embodiments of the disclosure.

FIG. 9 is a signal flowchart in case of selecting an edge application server based on UE type information according to various embodiments of the disclosure.

At operation 901, when transmitting an EAS discovery request message to the EES 100, the EEC 50 of the UE 50 may provide GPSI or UE type information (TAC value).

At operation 902, in case that only the UE ID is provided from the EEC 52 of the UE 50, the EES 100 may obtain the UE type information (e.g., IMEI or TAC) in interworking with the 3GPP network 40. A method for obtaining the UE type information by utilizing the UE ID from the 3GPP network may use the operations at operations 802*a* and 802*b*.

At operation 903, the EES 100 may select the EAS as follows by utilizing the TAC value provided from the 3GPP network 40.

Relationship information between the TAC value and the UE type may be preconfigured (locally configured) in the EES. As a different method or in addition to the above case, a UE dedicated EAS having a specific TAC value may be configured in the EES 100. If the UE dedicated EAS is configured in the EES 100 as described above, supportable UE type information may be mapped onto the TAC value, and may be stored in the EAS profile. The EAS profile information stored by the EES 100 may be provided to the EES 100 through an EAS registration to EES procedure. This will be further described with reference to FIG. 10 to be described later.

As another method, in order to identify the TAC value, the EES 100 may identify the UE type by accessing an external TAC database server.

After identifying the UE type, the EES 30 may determine whether to support the edge computing service.

At operation 904, the EES 30 may include information about the EAS selected through operation 903 in a service provisioning response message to be provided to the UE 50.

Figure 10:
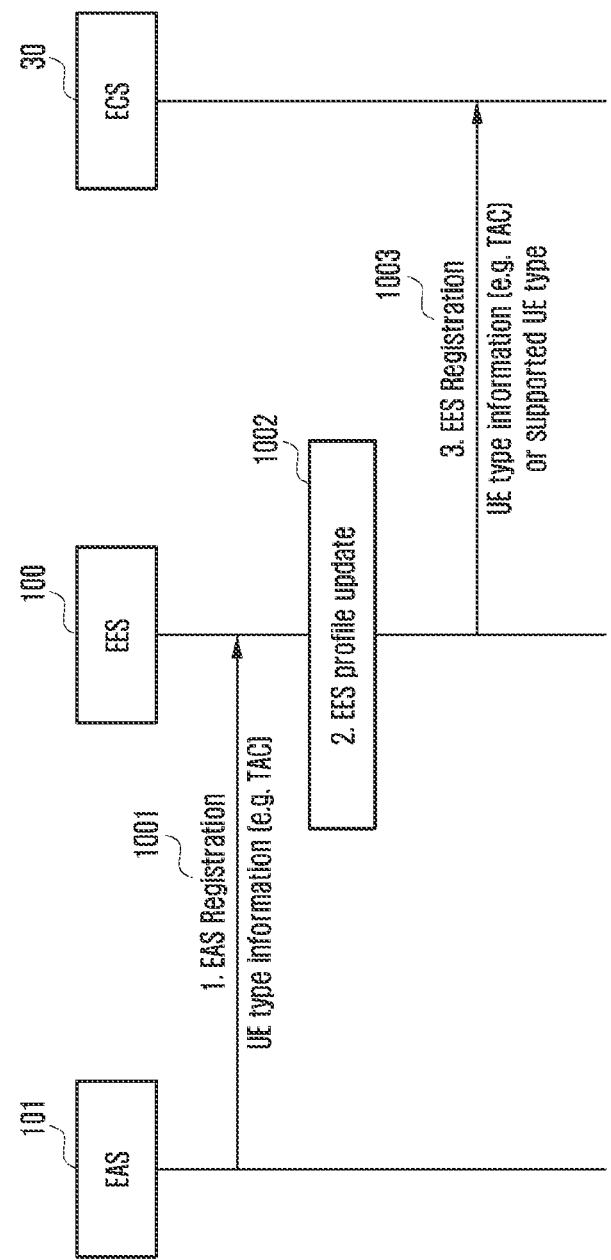
FIG. 10 is a signal flowchart in case of registering UE type information in an edge data network according to various embodiments of the disclosure.

FIG. 10 is a signal flowchart in case of registering UE type information in an edge data network according to various embodiments of the disclosure.

At operation 1001, the EAS 100 may transmit an EAS registration request message that is transmitted to the EES 100 to the EES 100. The EAS registration request message may include an EAS profile. Further, the EAS profile may include service available UE type information.

At operation 1002, the EES 100 may update the EES profile information based on the information provided from the EAS 101. In case that the EAS 101 is initially driven, the update operation performed by the EES 100 may correspond to a case that the EAS profile is immediately stored. As another example, in case that the driving history of the EAS 101 exists, and the corresponding EAS is turned off, and then is again turned on, the update operation that is performed in the EES 100 may be an operation of adding new information by comparing the difference between the two pieces of information. As still another example, in case that the driving history of the EAS 101 exists, and the corresponding EAS is turned off, and then is again turned on, the update operation that is performed in the EES 100 may be an operation of overwriting on the previous data, or storing a new profile through deletion of the existing profile.

At operation 1003, the EES 100 may provide the UE type information for the EES 100 to provide the service to the ECS 30 while sending an EES registration request message.

Through the above-described process, the ECS 30 may store the UE type information provided by the EES in which the ECS itself is registered. Further, the EES 100 may store the UE type information provided by the EAS registered in the EES itself.

Figure 11:
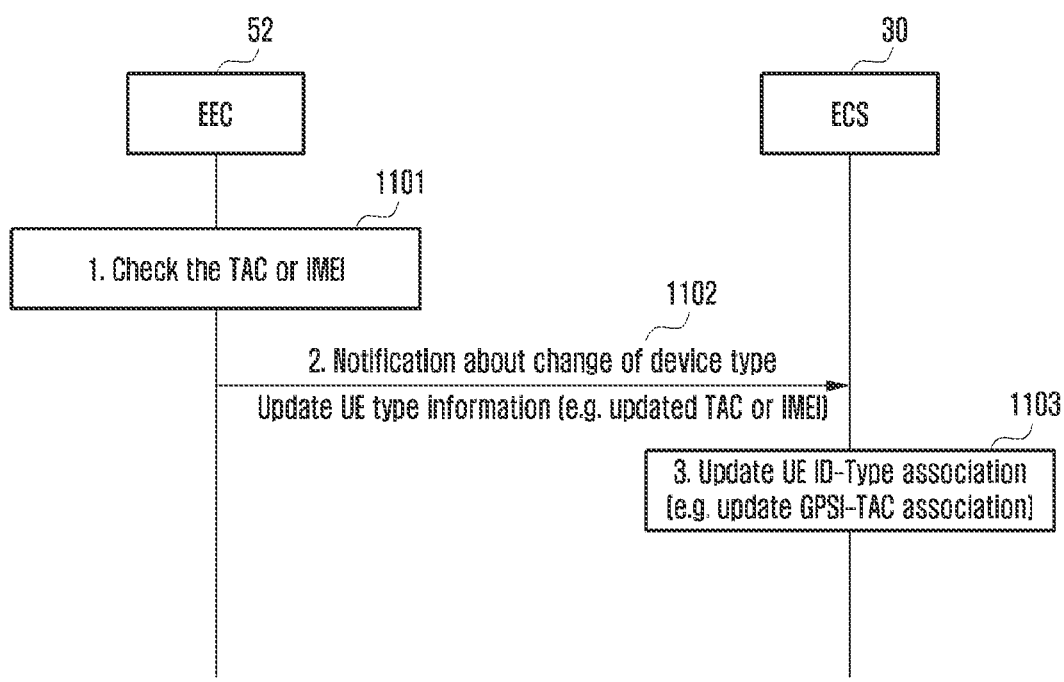
FIG. 11 is a signal flowchart in case of updating an UE type when an UE type change event occurs according to various embodiments of the disclosure.

FIG. 11 is a signal flowchart in case of updating an UE type when an UE type change event occurs according to various embodiments of the disclosure.

At operation 1101, the EEC 52 of the UE 50 may periodically identify the UE ID and UE type information, and may check (identify or determine) whether at least one change occurs for the UE ID and the UE type information. If at least one of the UE ID and the UE type information is changed, the EEC 52 of the UE 50 may create a notification message to be transmitted to the ECS 30 or the EES 100. The notification message may include updated UE type information, for example, at least one of a TAC value or an IMEI value.

At operation 1102, if the UE type change is detected, the EEC 52 may notify the ECS 30 or/and the EES 100 of the notification message created at operation 1101. Although FIG. 11 exemplifies only the ECS 30 for convenience in explanation, the notification message may be transmitted to the ECS 30, to the EES 100, or to both the ECS 30 and the EES 100. Hereinafter, explanation will be made on the assumption that the notification message is transmitted to the ECS 30.

At operation 1102, the message that is transmitted from the EEC 52 to the ECS 30 may be mapped onto the updated UE information, for example, the changed TAC or IMEI may be mapped onto the existing UE ID or EEC ID to be transmitted. The method for notifying the ECS 30 may utilize the service provisioning procedure. For example, whenever the UE type change is detected, the EEC 52 may request the EES information that coincides with the updated UE type by transmitting the service provisioning request message including the UE type information.

At operation 1103, the ECS 30 may update the UE type information provided from the EEC 5, and may provide the EES information that coincides with the updated UE type information to the EEC 52. Although FIG. 11 does not exemplify a procedure of providing the EES information that coincides with the UE type information to the EEC 52, the EES information that coincides with the UE type information may be provided to the EEC 52 together with whether to provide the service in accordance with the result of updating the UE type information.

Figure 12:
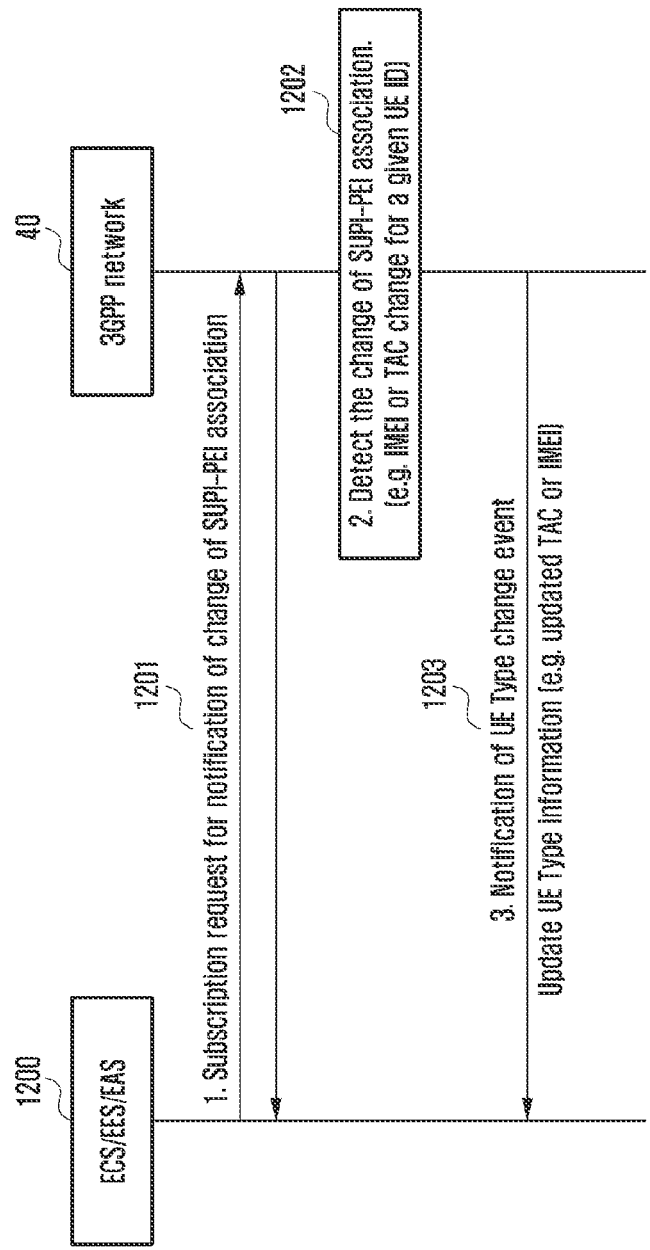
FIG. 12 is a signal flowchart in case of updating on a mobile communication network when a UE type is changed according to various embodiments of the disclosure.

FIG. 12 is a signal flowchart in case of updating on a mobile communication network when a UE type is changed according to various embodiments of the disclosure.

At operation 1201, the ECS 30, EES 100 and 200, or EAS 101, 102, and 201 may transmit a subscription request for notification of change of SUPI-PEI association message to a network exposure function (NEF) device, and the network exposure function device may provide a response to the subscription request. The subscription request message may include a UE identifier (e.g., GPSI). The subscription request for notification of change of SUPI-PEI association message may utilize a northbound API that the 3GPP network 40 provides through the network exposure function device. The network function (NF) device of the 3GPP network 40 having received the corresponding subscribe request may perform monitoring with respect to the SUPI-PEI association change event. For example, when the SUPI-PEI association change event occurs, the unified data management device (UDM) may transmit a notification message for the corresponding even to the ECS 30, the EES 100 and 200, or the EAS 101, 102, and 201 through the network exposure function device. The corresponding notification message may include the changed PEI information or TAC information in the PEI.

At operation 1202, the 3GPP network 40 may detect that the PEI value corresponding to the SUPI has been changed through the procedure of UE registration. If the corresponding event occurrence is detected, the 3GPP network 40 may identify the change of the IMEI or the TAC of the UE 50 from the updated PEI information.

At operation 1203, the 3GPP network 40 may provide the changed UE type information while transmitting a notification of UE type change event message to the ECS/EES/EAS having been subscribed through operation 1 as the result of the detection at operation 2. For example, the notification of UE type change event message including the IMEI or the TAC may be transmitted.

In the disclosure, although the IMEI or the TAC has been exemplarily explained as the UE type information, an operation of utilizing information representing various UE types is also included in the proposal of the disclosure within the limit that does not deviate from the scope of the disclosure. For example, the UE type information may be configured as a text string value directly representing a smart phone, an IoT device, or a vehicle, and may be used and exchanged in the operation proposed in the disclosure.

Figure 13:
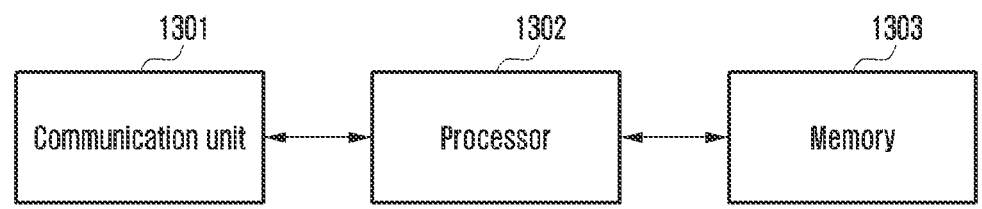
FIG. 13 is a functional block diagram of an NF of a mobile communication network or a server of an edge computing system according to various embodiments of the disclosure.

FIG. 13 is a functional block diagram of an NF of a mobile communication network or a server of an edge computing system according to various embodiments of the disclosure.

With reference to FIG. 13, the NF or the server may include a communication unit 1301, a processor 1302, and a memory 1303, which may be main configurations of each network function in each mobile communication network 40 or each server of the edge computing system. Further, although FIG. 13 exemplifies only basic configurations necessary for the disclosure, other configurations may be included, and may be implemented to be driven in the form of software in a specific server. As an example of another configuration, an interface that can be accessed by an operator may be included.

The communication unit 1301 may perform conversion and encoding/decoding to match a protocol so as to perform communication with the same other network in the network or another network node. For example, in case of the NF device of the mobile communication network, the communication unit 1301 may communicate with another NF device in the mobile communication network, and may communicate with a specific server of the edge computing network. As another example, in case that the configuration is the specific server of the edge computing network, it may communicate with another server in the edge data network, and may communicate with another NF of the mobile communication network. Further, it may perform transmission/reception of the signal/message/data from the UE through the mobile communication network.

The processor 1302 may be implemented as at least one processor, and may perform an operation according to each network function. The respective operations as described above may be controlled by the processor 1302.

The memory 1303 may store information required in each network function, and may store the messages as described above temporarily or semi-statically.

Although detailed embodiments have been described in the detailed description of the disclosure, it is apparent that various modifications are possible without departing from the scope of the disclosure. Accordingly, the scope of the disclosure should not be limited to the embodiments described above, but should be defined by not only the scope of the appended claims but also equivalents of the scope of the claims.

INDUSTRIAL APPLICABILITY

The technology of the device and the method according to the disclosure can be applied to a system that provides an edge computing service to a UE. Further, it can be applied to a system that provides other services (e.g., V2X service) to the UE.

The invention claimed is:

1. A method for providing, by an edge enabler server (EES) of an edge computing system, an edge computing service to user equipment (UE), the method comprising:
receiving a registration message including core network (CN) type information being available or being currently connected to the UE;
selecting a first network function (NF) device of a core network configured to provide an edge computing service to the UE based on the CN type information; and
transmitting a registration response message to the UE,
wherein the CN type information indicates one of:
a core network type, evolved packet core EPC, of a 4G mobile communication system; a core network type, 5G Core 5GC, of a 5G mobile communication system; or
a core network type, EPC+5GC, supporting both the 4G and 5G mobile communication systems.

2. The method of claim 1, further comprising monitoring a CN type being currently accessed by the UE through the first NF device in case that the CN type is EPC+5GC.

3. The method of claim 2, further comprising:
obtaining information related to a service application program interface (API) available to the UE from the first NF device through an N nef_APISupportCapability_Subscribe service operation with the first NF device; and
providing the obtained information related to the API to an edge application server (EAS) that provides a service to the UE.

4. The method of claim 1, further comprising:
receiving one of a CN type request of the UE or a service API availability API request from an edge application server (EAS) that provides the edge computing service to the UE; and
providing the CN type information of the UE to the EAS.

5. The method of claim 1, further comprising:
receiving, from the first NF, a new availability of service API information notification message for the UE; and
updating a relocation initiation capability based on the received new availability of the service API information notification message.

6. The method of claim 5, wherein the new availability of the service API information is provided in case that a second NF device combined with a unified data management (UDM) device unified with a home subscriber server (HSS) of the mobile communication system detects that the UE moves between a 4G mobile communication network and a 5G mobile communication.

7. The method of claim 1, further comprising performing registration of an edge application server (EAS) configured to provide an edge application service to the UE.

8. The method of claim 1, wherein:
in case that the CN type information indicates EPC, the first NF device is an NF device included in an EPC of the 4G mobile communication system,
in case that the CN type information indicates 5GC, the first NF device is an NF device included in a 5GC of the 5G mobile communication system, and
in case that the CN type information indicates EPC+5GC, the first NF device is one NF device in which the NF device included in the EPC and the NF device included in the 5GC are combined with each other.

9. The method of claim 8, wherein the NF device included in an EPC is a service capability exposure function (SCEF) device, and
wherein the NF device included in a 5GC is a network exposure function (NEF) device.

10. The method of claim 9, further comprising:
transmitting an availability message of a service application program interface (API) of the UE to the first NF device in case that the CN type indicates EPC+5GC;
receiving, from the first NF, a message including an availability of service API information for the UE; and
configuring a relocation initiation capability.

11. An edge enabler server (EES) device of an edge computing system comprising:
a communication unit configured to be able to communicate with user equipment (UE), at least one network function (NF) device of a mobile communication core network, and another node of an edge computing network;
a memory configured to store information related to the UE and edge computing service information; and
at least one processor,
wherein the at least one processor is configured to:
receive, through the communication unit, a registration message including core network (CN) type information being available or being currently connected to the UE,
select a first NF device of a core network configured to provide an edge computing service to the UE based on the CN type information, and
control the communication unit to transmit a registration response message to the UE, and
wherein the CN type information indicates one of:
a core network type, evolved packet core EPC, of a 4G mobile communication system: a core network type, 5G Core 5GC, of a 5G mobile communication system; or
a core network type, EPC+5GC, supporting both the 4G and 5G mobile communication systems.

12. The EES device of claim 11, wherein the at least one processor is configured to monitor a CN type being currently accessed by the UE through the first NF device in case that the CN type is EPC+5GC.

13. The EES device of claim 12, wherein the at least one processor is configured to:
obtain information related to a service application program interface (API) available to the UE from the first NF device through an N nef_APISupportCapability_Subscribe service operation with the first NF device, and provide the obtained information related to the API to an edge application server (EAS) that provides a service to the UE.

14. The EES device of claim 11, wherein the at least one processor is configured to:
receive one of a CN type request of the UE or a service API availability API request message from an edge application server (EAS) that provides the edge computing service to the UE through the communication unit, and
provide the CN type information of the UE to the EAS through the communication unit.

15. The EES device of claim 11, wherein the at least one processor is configured to:
receive a new availability of service API information notification message for the UE from the first NF through the communication unit, and
update a relocation initiation capability based on the received new availability of the service API information notification message.

16. The EES device of claim 15, wherein the new availability of the service API information is provided in case that a second NF device combined with a unified data management (UDM) device unified with a home subscriber server (HSS) of the mobile communication system detects that the UE moves between a 4G mobile communication network and a 5G mobile communication.

17. The EES device of claim 11, wherein the at least one processor is configured to perform registration of an edge application server (EAS) configured to provide an edge application service to the UE.

18. The EES device of claim 11, wherein:
in case that the CN type information indicates EPC, the first NF device is an NF device included in an EPC of the 4G mobile communication system,
in case that the CN type information indicates 5GC, the first NF device is an NF device included in a 5GC of the 5G mobile communication system, and
in case that the CN type information indicates EPC+5GC, the first NF device is one NF device in which the NF device included in the EPC and the NF device included in the 5GC are combined with each other.

19. The EES device of claim 18, wherein the NF device included in an EPC is a service capability exposure function (SCEF) device, and
wherein the NF device included in a 5GC is a network exposure function (NEF) device.

20. The EES device of claim 19, wherein the at least one processor is configured to:
transmit an availability message of a service application program interface (API) of the UE to the first NF device through the communication unit in case that the CN type indicates EPC+5GC
receive a message including an availability of service API information for the UE from the first NF through the communication unit, and
configure a relocation initiation capability.

* * * * *